(12) United States Patent
Carter

(10) Patent No.: US 10,046,894 B1
(45) Date of Patent: *Aug. 14, 2018

(54) VARIABLE SPEED HEAT AIR GUN AND COOPERATING KIT

(71) Applicant: Milton Carter, Homewood, IL (US)

(72) Inventor: Milton Carter, Homewood, IL (US)

( * ) Notice: Subject to any disclaimer, the term of this patent is extended or adjusted under 35 U.S.C. 154(b) by 717 days.

This patent is subject to a terminal disclaimer.

(21) Appl. No.: 14/592,728

(22) Filed: Jan. 8, 2015

Related U.S. Application Data

(63) Continuation-in-part of application No. 13/480,223, filed on May 24, 2012, now Pat. No. 8,942,550.

(51) Int. Cl.
*A47J 27/00* (2006.01)
*A61H 33/08* (2006.01)
*B65D 69/00* (2006.01)

(52) U.S. Cl.
CPC .................... *B65D 69/00* (2013.01)

(58) Field of Classification Search
None
See application file for complete search history.

(56) References Cited

U.S. PATENT DOCUMENTS

| | | | | |
|---|---|---|---|---|
| 1,564,896 A | * | 12/1925 | Truman | A45D 20/10 338/305 |
| 1,821,525 A | * | 9/1931 | Nielsen | A45D 20/12 392/385 |
| 1,946,262 A | | 2/1934 | Adams | |
| 2,432,067 A | * | 12/1947 | Morse | A45D 20/10 200/11 EA |
| 3,184,195 A | * | 5/1965 | Wahl et al. | 248/158 |
| 3,209,127 A | * | 9/1965 | Graves | A47L 1/16 219/202 |
| 3,211,890 A | * | 10/1965 | Graves | A47L 1/16 219/202 |
| 3,258,578 A | * | 6/1966 | Ferris | 392/404 |
| 3,668,370 A | * | 6/1972 | Pattison | F24H 3/0423 338/301 |
| 3,981,314 A | * | 9/1976 | Barradas | A45D 20/12 132/118 |
| 4,135,080 A | * | 1/1979 | Wells, Jr. | A45D 20/08 34/201 |
| 4,177,967 A | | 12/1979 | Marchus | |
| 4,198,557 A | * | 4/1980 | Crowley | A45D 20/12 132/212 |
| 4,260,875 A | * | 4/1981 | Walter et al. | 392/385 |
| 263,147 A | | 2/1982 | Iwasaki | |
| 4,551,615 A | | 11/1985 | Wilson | |
| 4,629,864 A | | 12/1986 | Wilson | |
| D290,221 S | | 6/1987 | Wilson et al. | |
| 4,683,370 A | | 7/1987 | Petersen et al. | |
| D344,969 S | | 3/1994 | Nakatani | |
| 5,412,842 A | * | 5/1995 | Riblett | 16/334 |
| 5,490,336 A | * | 2/1996 | Smick | A45D 20/12 34/82 |

(Continued)

*Primary Examiner* — Thor Campbell
(74) *Attorney, Agent, or Firm* — Richard L. Miller

(57) ABSTRACT

A kit for supporting and multi-directionally aiming a heat source. The kit includes a heat air gun, a tripod, and an extension arm. At least one of the tripod and the extension arm support the heat air gun so as to allow the heat air gun to be supported while having multi-directional aiming.

83 Claims, 22 Drawing Sheets

(56) References Cited

U.S. PATENT DOCUMENTS

| | | | | |
|---|---|---|---|---|
| 5,636,815 | A * | 6/1997 | Wilson | A45D 20/12 |
| | | | | 248/125.3 |
| 5,875,562 | A * | 3/1999 | Fogarty | A45D 20/10 |
| | | | | 34/97 |
| 5,974,690 | A * | 11/1999 | Canada | A45D 20/12 |
| | | | | 34/329 |
| 6,108,194 | A | 8/2000 | Seligman et al. | |
| D461,383 | S * | 8/2002 | Blackburn | D8/29.1 |
| 6,450,464 | B1 | 9/2002 | Thomas | |
| 7,152,695 | B2 * | 12/2006 | Happ | B25F 5/006 |
| | | | | 173/217 |
| 7,637,572 | B1 | 12/2009 | Cirami | |
| 7,982,163 | B2 * | 7/2011 | Chung et al. | 219/242 |
| 8,011,114 | B2 * | 9/2011 | Johnson | 34/413 |
| 8,307,948 | B2 * | 11/2012 | Parodi | A45D 20/12 |
| | | | | 181/212 |
| 8,942,550 | B1 * | 1/2015 | Carter | F24H 3/0423 |
| | | | | 248/168 |
| D726,959 | S * | 4/2015 | Fernandes da Costa | D28/18 |
| D726,960 | S * | 4/2015 | Fernandes da Costa | D28/18 |
| 2002/0121003 | A1 * | 9/2002 | Shuker | 16/380 |
| 2006/0006297 | A1 * | 1/2006 | Oddsen, Jr. | F16M 11/2014 |
| | | | | 248/282.1 |
| 2007/0177866 | A1 | 8/2007 | Fujimoto | |
| 2008/0090193 | A1 * | 4/2008 | Soanes | F26B 3/28 |
| | | | | 432/45 |
| 2008/0181590 | A1 * | 7/2008 | Radwill | F24H 3/0423 |
| | | | | 392/385 |
| 2011/0042535 | A1 * | 2/2011 | Cheng | 248/298.1 |
| 2011/0203128 | A1 * | 8/2011 | Rodrigues | A45D 20/12 |
| | | | | 34/96 |

\* cited by examiner

VARIABLE SPEED HEAT AIR GUN AND COOPERATING KIT

1. CROSS REFERENCES TO RELATED APPLICATIONS

The instant application is a Continuation-In-Part application of parent application Ser. No. 13/480,223, filed on May 24, 2012, for VARIABLE SPEED HEAT AIR GUN AND COOPERATING KIT, and incorporated herein in its entirety by reference thereto.

2. BACKGROUND OF THE INVENTION

A. Field of the Invention

The embodiments of the present invention relate to a heat source kit, and more particularly, the embodiments of the present invention relate to a kit for supporting and multi-directionally aiming a heat source.

B. Description of the Prior Art

Numerous innovations for heat guns and supports have been provided in the prior art, which will be described below in chronological order to show advancement in the art, and which are incorporated in their entirety herein by reference thereto. Even though these innovations may be suitable for the specific individual purposes to which they address, nevertheless, they differ from the present invention in that they do not teach a kit for supporting and multi-directionally aiming a heat source.

(1) U.S. Pat. No. 1,946,262 to Adams.

U.S. Pat. No. 1,946,262—issued to Adams on Feb. 6, 1934 in U.S. class 219 and subclass 39—teaches a hot air gun including a chamber having a compartment in communication therewith, an electric heating element arranged within the chamber and connected in a supply circuit, a thermostat located within the compartment adapted to open the circuit when the temperature in the compartment rises above a predetermined point, an air passage leading from the chamber, and an air inlet leading into the compartment and adapted to direct the incoming air around the thermostat before reaching the heating element chamber.

(2) U.S. Pat. No. 2,980,456 to McMullin.

U.S. Pat. No. 2,980,456—issued to McMullin on Apr. 18, 1961 in U.S. class 287 and subclass 58—teaches a sectional and telescopic pole including a plurality of tapered, tubular, elongated, and round sections of progressively smaller diameter, which telescopically interfitted. Each section has an end portion of internally enlarged wall thickness adjacent the small end thereof. The end portion defines a shoulder spaced a predetermined distance from the small end thereof. The end portion has a first radial opening therethrough between the shoulder and the small end. The section has a second radial opening therethrough adjacent the large end thereof. A plug closes the large end of each of the sections. The large end of each section is of slightly less diameter than the internal diameter of the adjacent outer section at the shoulder therein. The plug has a round shank extending into the large end and snugly received therein. The plug has an enlarged flange located outside of the large end. The flange is of smaller diameter than the internal diameter of the adjacent larger section up to the shoulder therein and is of larger diameter than the shoulder so that the flange is freely slidable within the adjacent larger section until it engages the shoulder therein. The shank has a single transverse passage therein transversely aligned with the second opening in the section and alignable with the first opening in the end portion of the adjacent outer section when the flange on the plug in the inner section abuts against the shoulder of the adjacent outer section. A pin is slidably disposed in the passage and a spring urges the pin outwardly whereby when the openings are aligned, the pin extends through both openings to positively mechanically lock the sections in their extended position with respect to each other. The pin is of lesser length than the passage so that the pin may be completely received within the passage. The plug is free of other connection to the section so that it may be entirely removed therefrom when the pin is completely received in the passage.

(3) U.S. Pat. No. 3,184,195 to Waqhl et al.

U.S. Pat. No. 3,184,195—issued to Waqhl et al. on May 18, 1965 in U.S. class 248 and subclass 158—teaches a supporting structure for an adjustable appliance, for example, an electric hair dryer that in use has several positions of angular orientation.

(4) U.S. Pat. No. 3,258,578 to Ferris.

U.S. Pat. No. 3,258,578 issued to Ferris on Jun. 28, 1966 in U.S. class 219 and subclass 273—teaches a steaming device including a portable and hand-held implement.

(5) U.S. Pat. No. 4,177,967 to Marchus.

U.S. Pat. No. 4,177,967—issued to Marchus on Dec. 11, 1979 in U.S. class 248 and subclass 229.1—teaches a guidance apparatus for controlling universal coupling movement of a tripod head, which includes control or guiding apparatus operatively connected to the head of the tripod and extending therefrom to contact the upper torso of the individual using the tripod independently of the individual's hands. The individual's upper torso movement controls the universal movement of the tripod head. The guidance apparatus, preferably, includes a guidance arm having a portion for contacting the shoulder front of the individual and a portion extending beneath the shoulder and between the upper arm and the upper torso. The portion extending between the upper arm and the upper torso is conveniently gripped by pressing the upper arm on the guidance apparatus against the upper torso during movement of the upper body in controlling the tripod head. The apparatus connecting the guidance apparatus to the tripod head is selectively adjustable to position the guidance arm in the most desired position and is also selectively flexible to allow swiveling or universal movement of the guidance arm with respect to the tripod head during use.

(6) U.S. Pat. No. 4,260,875 to Walter et al.

U.S. Pat. No. 4,260,875—issued to Walter et al. on Apr. 7, 1981 in U.S. class 219 and subclass 364—teaches a hair dryer. The temperature of the air stream from which is automatically controlled by the temperature of the hair being dried, is provided. The dryer includes a primary air inlet, a fan for blowing inlet air out of the dryer, and a heater by which the blown air is heated before it is directed against a user's hair. The dryer also includes a feedback air duct and a thermistor positioned in the duct to sense the temperature of the air being reflected off the user's hair as it is dried. In accordance with the temperature of the reflected air, the thermistor changes resistance, which change is sensed by an integrated circuit zero crossing switch that electronically signals a thermistor causing the thermistor either to switch off or proportionally reduce the power to the heater, and therefore the amount of heat energy input in the blown air. Consequently, the temperature of the air being blown against the user's hair is continuously monitored as the hair dries to avoid the hair and scalp from becoming overheated.

(7) U.S. Pat. No. Des. 263,147 to Iwasaki.

U.S. Pat. No. Des. 263,147—issued to Iwasaki on Feb. 23, 1982 in U.S. class D16 and subclass 244—teaches the ornamental design for a tripod.

(8) U.S. Pat. No. 4,551,615 to Wilson.

U.S. Pat. No. 4,551,615—issued to Wilson on Nov. 5, 1985 in U.S. class 392 and subclass 385—teaches a hot air gun having a hot air outlet provided with a guard plate having a substantially straight edge transverse to the general direction of the hot air flow. This straight edge is downstream of the hot air outlet and defines the downstream extremity of the guard plate. The latter defines the boundary on one side of the hot air flow from the outlet. Preferably, the guard plate has a flared flat part and a tubular part. The latter is detachably and rotatably mounted around the outlet.

(9) U.S. Pat. No. 4,629,864 to Wilson.

U.S. Pat. No. 4,629,864—issued to Wilson on Dec. 16, 1986 in U.S. class 392 and subclass 385—teaches a hot air gun capable of stripping paint, which includes a casing made of a pair of clam-shell members, an electric motor, a fan drivingly connected to the electric motor, heating apparatus including a former and a helical heating element projecting outside the casing and defining an air outlet at its ends, and an outer tubular member surrounding the projecting part of the inner tubular member. The inner and outer tubular members are clamped in position by the securing together of the pair of clam-shell members of the casing. Baffle apparatus is provided at the upstream end of the helical heating element for blocking an air flow path inside the element. The exposed surface of the outer tubular member is covered with a plurality of circumferential ribs.

(10) U.S. Pat. No. Des. 290,221 to Wilson et al.

U.S. Pat. No. Des. 290,221—issued to Wilson et al. on Jun. 9, 1987 in U.S. class D8 and subclass 71—teaches the ornamental design for a stand for a hot air gun.

(11) U.S. Pat. No. 4,683,370 to Petersen et al.

U.S. Pat. No. 4,683,370—issued to Petersen et al. on Jul. 28, 1987 in U.S. class 392 and subclass 385—teaches a hot air gun or blower of the type usable for blistering paint on a painted surface for easing the removal of paint thereof, which has a housing with internal brackets supporting and retaining a switch assembly, a circuit board, a motor having an impeller, a motor mount, a shroud surrounding the impeller, and a heating element. The internal brackets supporting these elements are configured so as to provide a number of air passages between the elements and the interior wall of the housing. In addition to drawing air through a rear portion of the gun, air is drawn through an annular opening in the front of the gun between the cover for the heating element and the housing. The air thus passes over the covered heating coil and is preheated before being blown by the impeller directly over the coil for primary heating. At least one wave-like flange is received between spaced interior brackets in the housing for providing a press fit of the components between the two housing halves, thus eliminating the need for mechanical fasteners for mounting the components of the gun.

(12) U.S. Pat. No. Des. 344,969 to Nakatani.

U.S. Pat. No. Des. 344,969—issued to Nakatani on Mar. 8, 1994 in U.S. class D16 and subclass 244—teaches the ornamental design for a video camera tripod.

(13) U.S. Pat. No. 5,412,842 to Riblett.

U.S. Pat. No. 5,412,842—issued to Riblett on May 9, 1995 in U.S. class 16 and subclass 334—teaches a detent hinge supports a vertically or horizontally swinging door to the frame. The detent hinge releasably retains the door in a predetermined position relative to the frame when the door is rotated to open or to close.

(14) U.S. Pat. No. 5,490,336 to Smik et al.

U.S. Pat. No. 5,490,336—issued to Smik et al on Feb. 13, 1996 in U.S. class 34 and subclass 97—teaches an add-on filters for heated-air blowers and other electric motor-powered appliances. The filters are fabricated from a washable, flexible, reticulated foam which traps even minute solid and liquid particles and is adhesively attached to the blower housing. A template, which also serves as a protective cover for the adhesive, has index lines along which a blank of the filter material can be trimmed to size and configured for a particular blower intake.

(15) U.S. Pat. No. 6,108,194 to Seligman et al.

U.S. Pat. No. 6,108,194—issued to Seligman et al. on Aug. 22, 2000 in U.S. class 361 and subclass 600—teaches an electronics casing is formed from interlocking upper, lower, and side panels, and a pair of end plates. Grooves are formed in the outer surface of the lower panel for mounting the casing on the legs or struts of tripods or other lighting supports. The weight of the casing helps counter-balance lighting elements supported on the tripod and holds the casing in place. Multiple casings are connected together using dovetail tongue and groove connectors on the sides of the casing.

(16) U.S. Pat. No. Des. 461,383 to Blackburn.

U.S. Pat. No. Des. 461,383—issued to Blackburn on Aug. 13, 2002 in U.S. class D8 and subclass 29.1—teaches an ornamental design for a heat gun with positioning stand therefor.

(17) United States Patent Application Publication Number 2002/0121003 to Shuker.

United States Patent Application Publication Number 2002/0121003—published to Shuker on Sep. 5, 2002 in U.S. class 16 and subclass 380—teaches a vehicle hinge assembly for hanging a vehicle door on a vehicle body. The assembly comprises a first hinge leaf hingedly connected to a second hinge leaf by a pivot pin. The pivot pin is immovably mounted in one hinge leaf and is rotatably mounted in, and axially withdrawable from, the other hinge leaf. Hinge pin retention means is associated with the other hinge leaf for preventing axial withdrawal of the hinge pin therefrom. The hinge pin retention means having hinge pin engagement means movably mounted between first and second positions. The engagement means in its first position engages with the hinge pin to permit rotation of the hinge pin but prevent its axial movement relative to the other hinge leaf The engagement means in its second position is spaced from the hinge pin to permit its axial withdrawal from the other hinge leaf.

(18) U.S. Pat. No. 6,450,464 to Thomas.

U.S. Pat. No. 6,450,464—issued to Thomas on Sep. 17, 2002 in U.S. class 248 and subclass 168—teaches a satellite dish stand for providing a transportable stabile base for mounting a satellite dish. The satellite dish stand includes a pipe member with a lumen extending between an upper end and a lower end so that the upper end is designed for receiving a post of a satellite dish, an upper collar fixedly coupled to the pipe member, a lower collar coupled to the pipe member, a plurality of leg members each with an upper portion coupled to the upper collar, and a plurality of leg support struts coupled to extend between the lower collar and an associated one of the leg members.

(19) United States Patent Application Publication Number 2006/0006297 to Oddsen et al.

United States Patent Application Publication Number 2006/0006297—published to Oddsen et al. on Jan. 12, 2006 in U.S. class 248 and subclass 282.1—teaches an extension arm apparatus for mounting devices, such as flat panel monitors above a workspace. The apparatus includes upper and lower channels connected to a pair of end-caps. One end-cap is connected to the workspace and the other end-cap is connected to an extension arm or the to device to be mounted. At least one of the channels includes a reinforcement structure providing additional support to the apparatus. The reinforcement structure is tapered. A forearm extension also includes a reinforcement structure. The end-caps have interior spacers that provide clearance for the sidewalls of the channels that are fabricated without parting lines.

(20) United States Patent Application Publication Number 2007/0177866 to Fujimoto.

United States Patent Application Publication Number 2007/0177866—published to Fujimoto on Aug. 2, 2007 in U.S. class 396 and subclass 376—teaches a device for facilitating the taking of photographic self portraits. The device includes a handle sized to be held by a single hand of a user. The device further includes an extension arm appended at its proximal end to the handle and at its distal end to a camera holder. The extension arm is configured to position a camera secured to the camera holder sufficiently above the handle to eliminate the handle from the field of a picture taken. The device also includes a camera and a mirror secured to the camera holder. The mirror is sized and positioned with respect to the camera to enable a user to preview an image to be captured by the camera in creating a photographic self portrait.

(21) United States Patent Application Publication Number 2008/0181590 to Radwill et al.

United States Patent Application Publication Number 2008/0181590—published to Radwill et al. on Jul. 31, 2008 in U.S. class 392 and subclass 385—teaches a heating device such as a heat gun or heat unit which includes a surface temperature sensor to measure the surface temperature of the work piece being heated.

(22) U.S. Pat. No. 7,591,604 to Roberts.

U.S. Pat. No. 7,591,604—issued to Roberts on Sep. 22, 2009 in U.S. class 403 and subclass 101—teaches a knuckle joint locking and release mechanism for a power tool, which has a locking mode where relative articulation between two body portions of the power tool is prevented and a release mode where relative articulation between the two body portions of the power tool is unhindered. The knuckle joint locking and release mechanism is biased into the locking mode, but can be placed into the release mode by engaging an actuator pushbutton located on either side of the knuckle joint.

(23) U.S. Pat. No. 7,637,572 to Cirami.

U.S. Pat. No. 7,637,572—issued to Cirami on Dec. 29, 2009 in U.S. class 297 and subclass 451.2—teaches a skywatcher's tripod having a seat mounted on a rider support that swivels 360° on a base having upwardly foldable tripod legs. A post forms a forward end of the rider support. An extension arm configured to secure a tripod head for attachment of a surveillance device is axially slidable in a holder that is pivotally secured to the upper end of the post for rotation towards the seated user. The user sights on targets from horizon to zenith depending on the rotated position of the holder and the extension of the arm. The seat folds against the post outboard of the folded tripod legs and is held in a folded position by a folded leg that abuts a handle that extends from a bottom side of the seat. The rider support includes a swivel lock and a combination holder/extension arm lock.

(24) United States Patent Application Publication Number 2011/0042535 to Cheng.

United States Patent Application Publication Number 2011/0042535—published to Cheng on Feb. 24, 2011 in U.S. class 248 and subclass 298.1—teaches a positioning apparatus for an optical instrument of the present invention includes a base seat, a holder and at least one sliding member. The bottom of the base seat is formed with a sliding groove. The sliding groove has an opening facing downward. The width of the opening is smaller than the maximum width of the sliding groove. The base seat is formed with plurality of fixation holes, which are arranged along the longitudinal direction of the sliding groove. The holder is disposed on the base seat. The holder is adapted for the optical instrument to be assembled thereon. The sliding member has a suitable cross-section, so that the sliding member is slidably disposed in the sliding groove. The sliding member abuts selectively against one of the fixation holes. As such, the sliding member is adjustable and can be held in the sliding groove.

(25) U.S. Pat. No. 7,982,163 to Chung et al.

U.S. Pat. No. 7,982,163—issued to Chung et al. on Jul. 19, 2011 in U.S. class 219 and subclass 242—teaches a heat gun having a body with a support mechanism mounted on the handle. The support mechanism includes at least one arm moveably mounted on the handle and which is capable of moving between a first retracted position and a second extended position. The at least one arm, when in its extended position, is capable of co-operating with the body to form a platform upon which the heat gun can rest on a work surface while the nozzle is placed remotely from the work surface.

(26) U.S. Pat. No. 8,011,114 to Johnson.

U.S. Pat. No. 8,011,114—issued to Johnson on Sep. 6, 2011 in U.S. class 34 and subclass 413—teaches a vehicle dryer includes an energy-conserving rotatable inlet butterfly valve to selectively admit or block air to a fan encased in a blower housing. The valve includes a plate mounted on a shaft that extends across the inlet portion of the blower housing. The plate is rotated by its shaft to either an opened position for admitting air into a blower housing, or a closed position for blocking air from entering into the blower housing. A crank arm is coupled to the valve shaft, and a pneumatic cylinder includes a piston rod for turning the crank arm through a ninety-degree angle, thereby rotating the valve plate between its opened and closed positions.

(27) U.S. Pat. No. 8,672,576 to Lee.

U.S. Pat. No. 8,672,576—issued to Lee on Mar. 18, 2014 in U.S. class 403 and subclass 122—teaches a ball joint. The ball joint includes a spherical ball stud, a shaft coupled to a side of the ball stud, a holder having a seat portion to surround an outer circumference of the ball stud, and an elastic portion protruding upwards from the holder, having on an inner circumference thereof an inclined surface to limit a tilting angle of a portion of the shaft adjacent to the ball stud, and undergoing elastic deformation when the shaft is tilted at a maximum angle, so that the elastic portion absorbs shock when the ball joint is rotated to the maximum, thus preventing damage or removal of parts It is apparent that numerous innovations for heat guns and supports have been provided in the prior art, which are adapted to be used. Furthermore, even though these innovations may be suitable for the specific individual purposes to which they address, nevertheless, they would not be suitable for the purposes of the embodiments of the present invention as heretofore described, namely, a kit for supporting and multi-directionally aiming a heat source.

3. SUMMARY OF THE INVENTION

Thus, an object of the embodiments of the present invention is to provide a kit for supporting and multi-directionally aiming a heat source, which avoids the disadvantages of the prior art.

Briefly stated, another object of the embodiments of the present invention is to provide a kit for supporting and multi-directionally aiming a heat source. The kit includes a heat air gun, a tripod, and an extension arm. At least one of the tripod and the extension arm support the heat air gun so as to allow the heat air gun to be supported while having multi-directional aiming.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying figures of the drawing.

4. BRIEF DESCRIPTION OF THE FIGURES OF THE DRAWING

The figures of the drawing are briefly described as follows.

4. LIST OF REFERENCE NUMERALS UTILIZED IN THE FIGURES OF THE DRAWING

Figure 1:
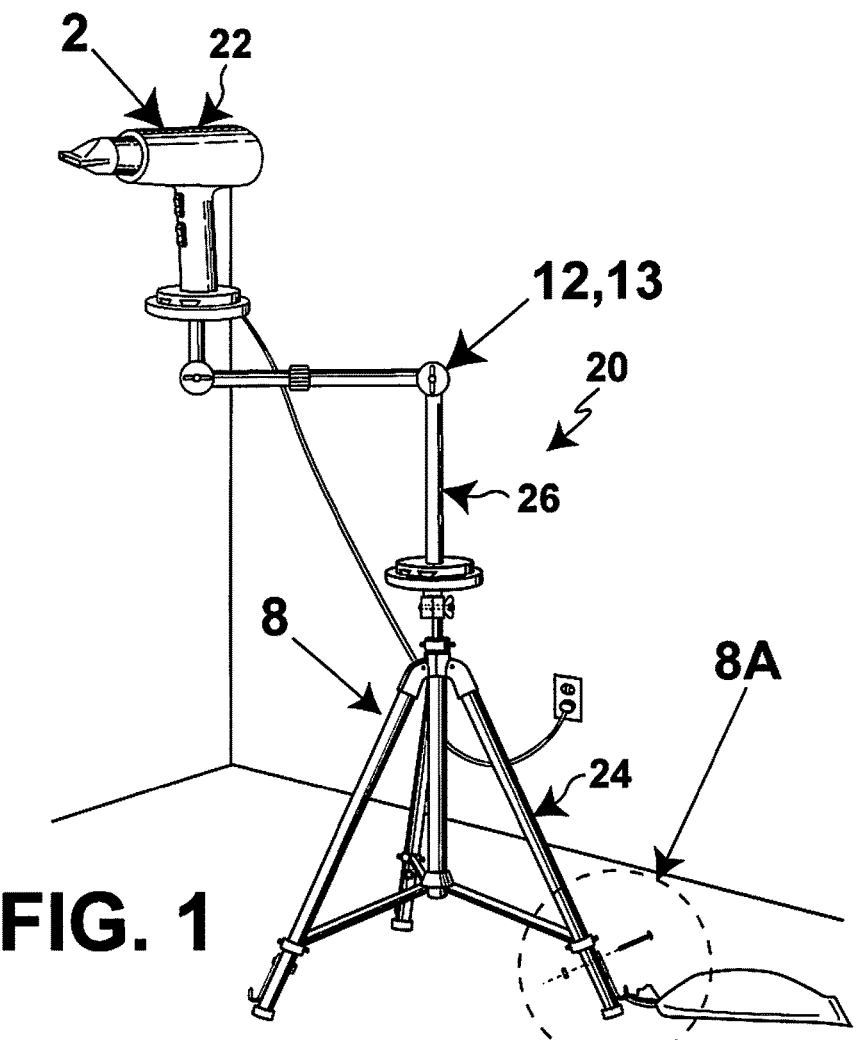
FIG. 1 is a diagrammatic perspective view of the kit of a first embodiment of the present invention supporting and multi-directionally aiming a heat source.

A. Introductory.
20 kit of first embodiment of present invention for supporting and multi-directionally aiming heat source
B. Overall Configuration of First Embodiment of Kit 20.
22 heat air gun
24 tripod
26 extension arm
  (1) Specific Configuration of Heat Air Gun 22.
28 housing of heat air gun 22
30 barrel of heat air gun 22
32 handle of heat air gun 22
34 distal end of barrel 30 of heat air gun 22
36 distal end of handle 32 of heat air gun 22
38 barrel grille of heat air gun 22
40 air flow nozzle of heat air gun 22
42 rear end of housing 28 of heat air gun 22
44 air intake of housing 28 of heat air gun 22
46 door of housing 28 of heat air gun 22
48 hinge assembly of door 46 of housing 28 of heat air gun 22
50 foam filter pad of heat air gun 22 for filtering air entering air intake 44 of heat air gun 22
52 motor of heat air gun 22 for drawing cold air into air intake 44 of heat air gun 22 and expelling heated air out of barrel 30 of heat air gun 22
53 heating element of heat air gun 22 for heating cold air drawn into air intake 44 of heat air gun 22
54 first rocker switch of heat air gun 22
56 second rocker switch of heat air gun 22
58 base plate of heat air gun 22 for allowing heat air gun 22 to stand upright on it own on flat surface without need to be held
60 lower free surface of base plate 58 of heat air gun 22
62 pair of dovetail mortises of base plate 58 of heat air gun 22
64 rear side of handle 32 of heat air gun 22
66 electrical cord of heat air gun 22
68 power source interface of electrical cord 66 of heat air gun 22 for electrically communicating with AC power source 70
70 AC power source
72 cord strain relief of electrical cord 66 of heat air gun 22
  (a) Specific Configuration of Hinge Assembly 48 of Heat Air Gun 22.
74 pair of exterior barrels of hinge assembly 48 of heat air gun 22
76 blind bore of rear end 42 of the housing 28 of heat air gun 22 of hinge assembly 48 of heat air gun 22
78 coil spring of hinge assembly 48 of heat air gun 22
80 ball of hinge assembly 48 of heat air gun 22
82 interior barrel of hinge assembly 48 of heat air gun 22
84 pintle of hinge assembly 48 of heat air gun 22
86 pair of pintle ends of pintle 84 of hinge assembly 48 of heat air gun 22
88 plurality of blind bores of interior barrel 82 of hinge assembly 48 of heat air gun 22
  (b) Specific Configuration of Base Plate 58 of Heat Air Gun 22.
90 generally circular periphery of base plate 58 of heat air gun 22
91 pair of ends of pair of dovetail mortises 62 of base plate 58 of heat air gun 22, respectively
92 blind bore of base plate 58 of heat air gun 22
  (2) Specific Configuration of Tripod 24.
94 trifucated hip bracket of tripod 24
96 central through bore of trifucated hip bracket 94 of tripod 24
98 three sockets of trifucated hip bracket 94 of tripod 24
100 three legs of tripod 24
101 distal ends of three legs 100 of tripod 24, respectively, for resting on supporting surface 102
102 supporting surface
104 three rubber feet of tripod 24 for increased traction for tripod 24
106 fixed outer center column of tripod 24
108 distal end of fixed outer center column 106 of tripod 24
110 three leg braces of tripod 24
112 three lemon squeeze leg locks of tripod 24
114 pair of opposing buttons of each of three lemon squeeze leg locks 112 of tripod 24
116 adjustable inner center column of tripod 24
118 lemon squeeze column lock of tripod 24
120 pair of opposing buttons of lemon squeeze leg lock 118 of tripod 24
122 selectively rotatable and lockable joint of tripod 24
124 pair of opposing interlocking jaws of selectively rotatable and lockable joint 122 of tripod 24
126 cooperating threaded shaft and wing nut of selectively rotatable and lockable joint 122 of tripod 24
128 platform of tripod 24
129 hook of each leg of three legs 100 of tripod 24
129a nut and bolt hook 129 of each leg of three legs 100 of the tripod 24
129b weight of each leg of three legs 100 of the tripod 24 for adding stability to tripod 24
  (a) Specific Configuration of Platform 128 of Tripod 24.
130 upper free surface of platform 128 of tripod 24
132 pair of dovetail tenons of platform 128 of tripod 24
134 generally circular periphery of platform 128 of tripod 24
136 pair of ends of pair of dovetail tenons 132 of platform 128 of tripod 24, respectively
138 blind bore of platform 128 of tripod 24
140 coil spring of platform 128 of tripod 24
142 ball of platform 128 of tripod 24
  (3) Specific Configuration of Extension Arm 26.
144 base plate of extension arm 26
146 lower fixed pole of extension arm 26
148 distal end of lower fixed pole 146 of extension arm 26
150 selectively rotatable and lockable lower joint of extension arm 26
152 outer upper pole of extension arm 26
154 distal end of outer upper pole 152 of extension arm 26
156 twist lock locking mechanism of extension arm 26
158 inner upper pole of extension arm 26

160 distal end of inner upper pole 158 of extension arm 26
162 selectively rotatable and lockable upper joint of extension arm 26
164 neck of extension arm 26
166 distal end of neck 164 of extension arm 26
168 platform of extension arm 26
  (a) Specific Configuration of Each of Selectively Rotatable and lockable lower joint 150 of extension arm 26 and selectively rotatable and lockable upper joint 162 of extension arm 26.
170 The pair of opposing interlocking jaws of each of selectively rotatable and lockable lower joint 150 of extension arm 26 and selectively rotatable and lockable upper joint 162 of extension arm 26
172 cooperating threaded shaft and wing nut of each of selectively rotatable and lockable lower joint 150 of extension arm 26 and selectively rotatable and lockable upper joint 162 of extension arm 26
C. Overall Configuration of Second Embodiment of Kit 220.
220 kit of second embodiment of present invention for supporting and multi-directionally aiming a heat source
222 heat air gun
224 tripod
226 extension arm
  (1) Specific Configuration of Heat Air Gun 222.
228 housing of heat air gun 222
230 barrel of heat air gun 222
232 handle of heat air gun 222
234 distal end of barrel 320 of heat air gun 222
236 distal end of handle 232 of heat air gun 222
242 upper rear end of housing 228 of heat air gun 222
244 air intake of housing 228 of heat air gun 222
246 vented twist-on cap of air intake 244 of heat air gun 222
250 replaceable paper filter of air intake 244 of heat air gun 222 for filtering air entering vented twist on cap 246 of air intake 144 of heat air gun 222
252 motor of heat air gun 222
252a impeller of heat air gun 222 for drawing cold air into air intake 244 of heat air gun 222 and expelling heated air out of barrel 230 of heat air gun 222
253 heating element coils of heat air gun 222 for heating cold air drawn into air intake 244 of heat air gun 222
254 first rocker switch of heat air gun 222
256 second rocker switch of heat air gun 222
258 base of heat air gun 222
260 lower free surface of base 258 of heat air gun 222 for allowing heat air gun 222 to stand upright on its own on flat surface without need to be held
264 rear side of base 232 of heat air gun 222
266 electrical cord of heat air gun 222
267 battery pack of heat air gun 222
268 power source interface of electrical cord 266 of heat air gun 222 for electrically communicating with an AC power source 270.
270 AC power source
  (a) Specific Configuration of Base 258 of Heat Air Gun 222.
280 pair of opposite sides of base 258 of heat air gun 222
282 pair of push buttons 282 of base 258 of heat air gun 222
284 central spring seat of base 258 of heat air gun 222
286 pair of coil springs of base 258 of heat air gun 222
288 pair of ends of each push button of pair of push buttons 282 of base 258 of heat air gun 222
290 pair of clips of each push button of pair of push buttons 282 of base 258 of heat air gun 222
  (2) Specific Configuration of Tripod 224.
294 trifucated hip bracket of tripod 224
296 central through bore of trifucated hip bracket 294 of tripod 224
298 three sockets of trifucated hip bracket 294 of tripod 224
300 three legs of tripod 224
301 distal ends of three legs 300 of tripod 224, respectively, for resting on supporting surface 302
302 supporting surface
304 three lockable casters of tripod 224 for increased mobility of tripod 224
306 fixed outer center column of tripod 224
308 distal end of fixed outer center column 306 of tripod 224
310 three leg braces of tripod 224
312 three lemon squeeze leg locks of tripod 224
314 pair of opposing buttons of each lemon squeeze leg lock of three lemon squeeze leg locks 312 of tripod 224
316 height adjustable inner center column of tripod 224
318 lemon squeeze column lock of tripod 224
320 pair of opposing buttons of lemon squeeze leg lock 318 of tripod 224
322 selectively rotatable and lockable joint of tripod 224
324 pair of opposing interlocking jaws of selectively rotatable and lockable joint 322 of tripod 224
326 cooperating threaded shaft and wing nut of selectively rotatable and lockable joint
322 of tripod 224
328 platform of tripod 224
329 hook of each leg of three legs 300 of tripod 224
329a adjustable weight of tripod 224
329b through bore of adjustable weight 329a of tripod 224
329c pair of hook and loop fastener straps of adjustable weight 329a of tripod 224
  (a) Specific configuration of platform 328 of tripod 224.
330 free top of platform 328 of tripod 224
332 pair of side walls of platform 328 of tripod 224
334 pair of notches of each side wall of pair of side walls 332 of platform 128 of tripod
224
  (3) Method of Attaching and Releasing Heat Air Gun 222 to and from Tripod 224, Respectively.
none
  (4) Specific Configuration of Extension Arm 226.
344 base of extension arm 226
346 lower fixed pole of extension arm 226
348 distal end of lower fixed pole 346 of extension arm 226
350 selectively rotatable and lockable lower joint of extension arm 226
352 outer upper pole of extension arm 226
354 distal end of outer upper pole 352 of extension arm 226
356 twist lock locking mechanism of extension arm 226
358 height adjustable inner upper pole of extension arm 226
360 distal end of height adjustable inner upper pole 358 of extension arm 226
362 selectively rotatable and lockable upper joint of extension arm 236
368 platform of extension arm 226
  (a) Specific Configuration of Each of Selectively Rotatable and Lockable Lower Joint 350 of Extension Arm 226 and Selectively Rotatable and Lockable Upper Joint 362 of Extension Arm 226.
370 push button of each of selectively rotatable and lockable lower joint 350 of extension arm 226 and selectively rotatable and lockable upper joint 362 of extension arm 226

(5) Accessories.
380 clip for attaching heat air gun 222 to desired structure 384
382 platform
384 desired structure
386 stanchion base for attaching heat air gun 222 to horizontal surface 390
388 platform
390 horizontal surface

5. DETAILED DESCRIPTION OF THE PREFERRED EMBODIMENTS

A. Introductory.

Referring now to the figures, in which like numerals indicate like parts, and particularly to FIG. 1, which is a diagrammatic perspective view of the kit of a first embodiment of the present invention supporting and multi-directionally aiming a heat source, the kit of the first embodiment of the present invention is shown generally at 20 for supporting and multi-directionally aiming a heat source.

B. Overall Configuration of the First Embodiment of the Kit 20.

The overall configuration of the first embodiment of the kit 20 can best be seen in FIG. 1, which is again is a diagrammatic perspective view of the kit of a first embodiment of the present invention supporting and multi-directionally aiming a heat source, and as such, will be discussed with reference thereto.

The kit comprises a heat air gun 22, a tripod 24, and an extension arm 26. The tripod 24 and/or the extension arm 26 support(s) the heat air gun 22 so as to allow the heat air gun 22 to be supported while having multi-directional aiming.

(1) Specific Configuration of the Heat Air Gun 22.

Figure 2:
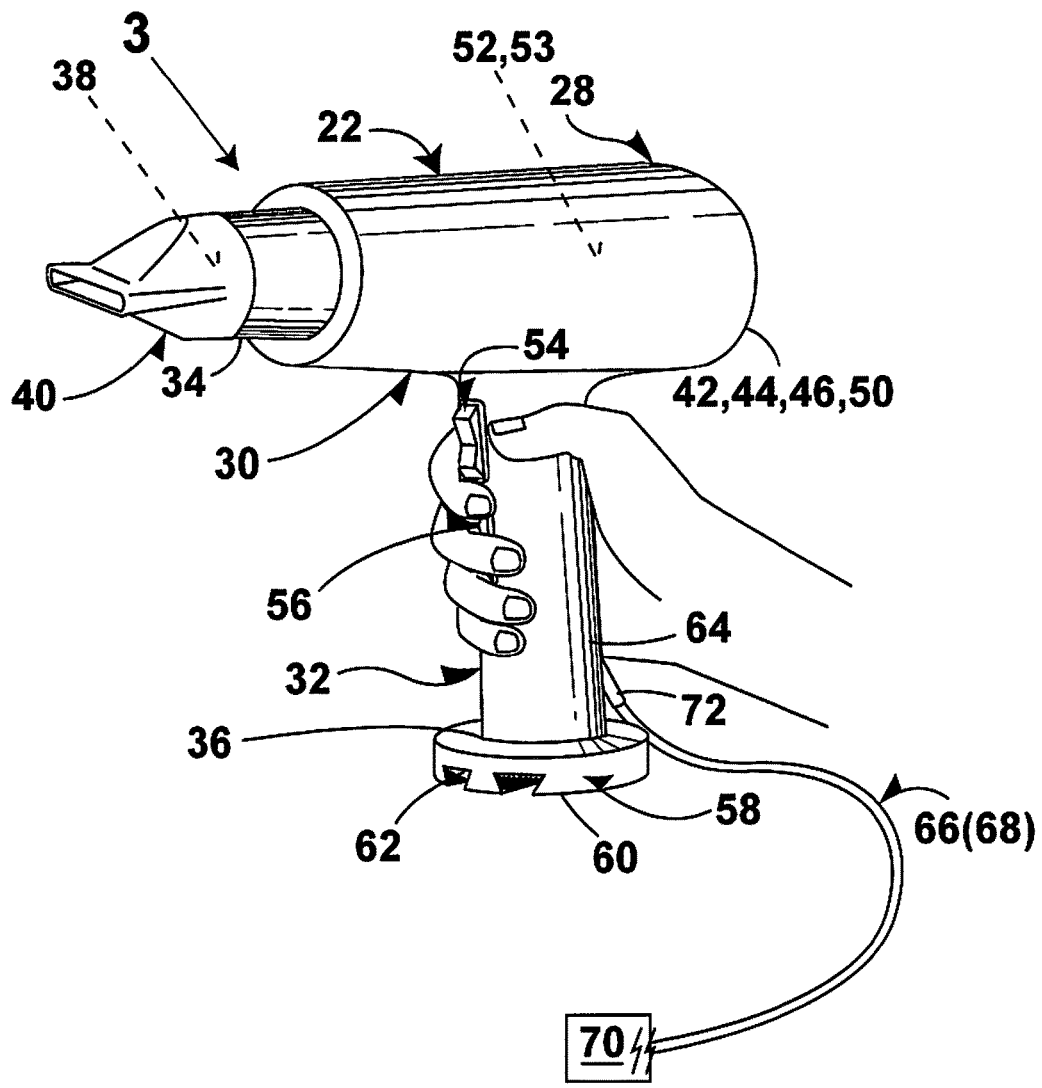
FIG. 2 is an enlarged diagrammatic perspective view of the heat air gun of the kit of the first embodiment of the present invention identified by ARROW 2 in FIG. 1.
Figure 3:
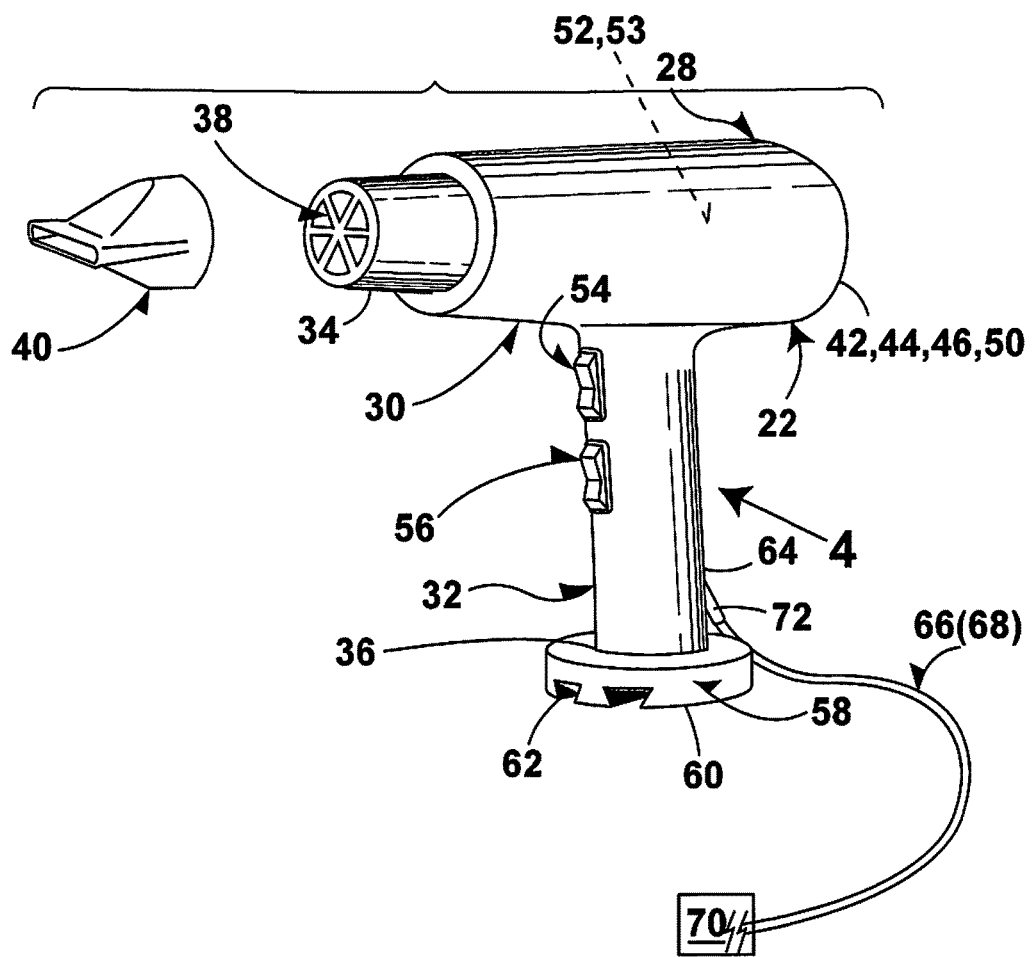
FIG. 3 is an exploded diagrammatic perspective view of the heat air gun of the kit of the first embodiment of the present invention shown in FIG. 2.
Figure 4:
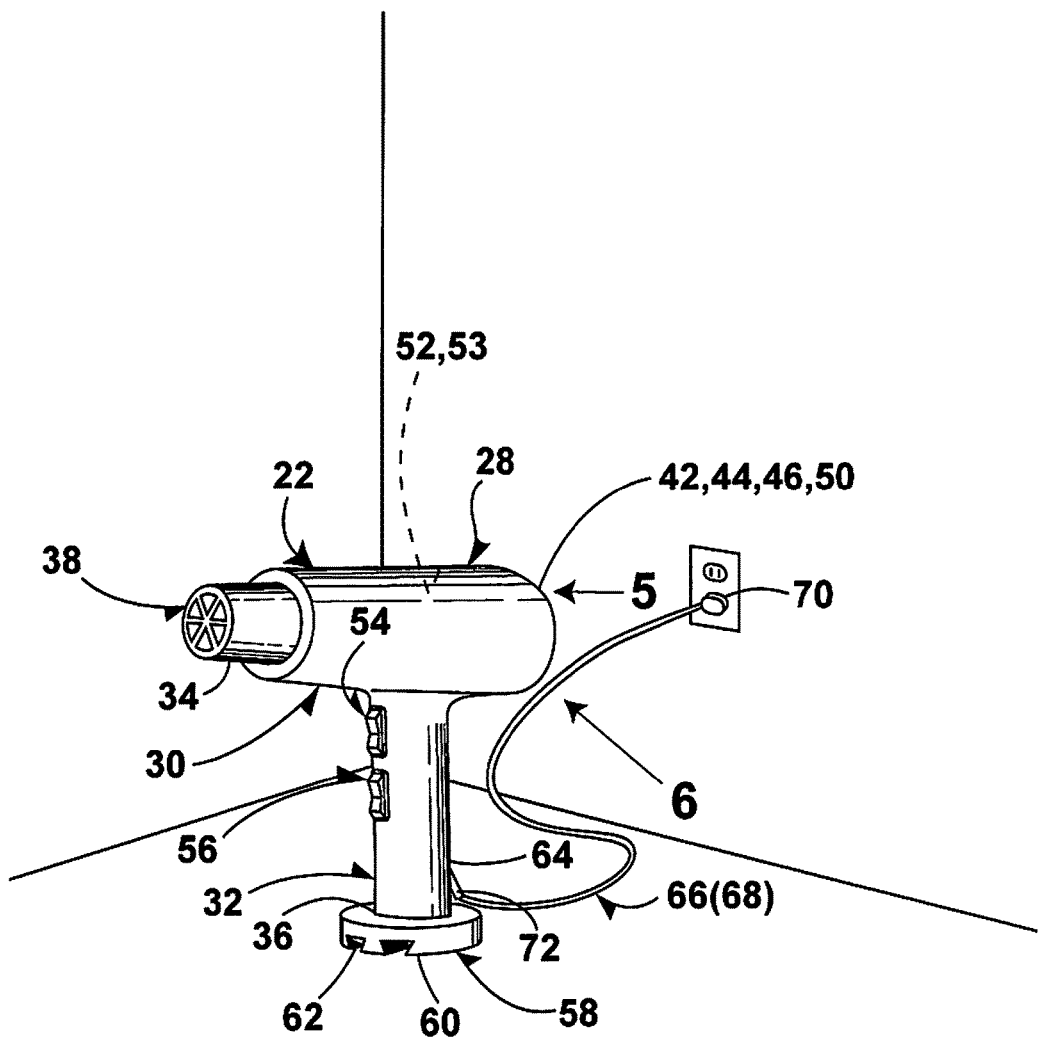
FIG. 4 is a reduced diagrammatic perspective view of the heat air gun of the kit of the first embodiment of the present invention shown in FIG. 3 and multi-directionally aiming a heat source.

The specific configuration of the heat air gun 22 can best be seen in FIGS. 2, 3, 4, 5, and 6, which are, respectively, an enlarged diagrammatic perspective view of the heat air gun of the kit of the first embodiment of the present invention identified by ARROW 2 in FIG. 1, an exploded diagrammatic perspective view of the heat air gun of the kit of the first embodiment of the present invention shown in FIG. 2, a reduced diagrammatic perspective view of the heat air gun of the kit of the first embodiment of the present invention shown in FIG. 3 and multi-directionally aiming a heat source, an enlarged diagrammatic rear end view taken generally in the direction of ARROW 5 in FIG. 4 of the heat air gun of the kit of the first embodiment of the present invention, and an enlarged diagrammatic side elevational view taken generally in the direction of ARROW 6 in FIG. 4 of the heat air gun of the kit of the first embodiment of the present invention, and as such, will be discussed with reference thereto.

The heat air gun 22 comprises a housing 28, a barrel 30, and a handle 32.

The barrel 30 of the heat air gun 22 extends generally horizontally from the housing 28 of the heat air gun 22 to a distal end 34.

The handle 32 of the heat air gun 22 depends generally perpendicularly from the housing 32 of the heat air gun 22 to a distal end 36.

The heat air gun 22 further comprises a barrel grille 38.

The barrel grille 38 of the heat air gun 22 is disposed over the distal end 34 of the barrel 30 of the heat air gun 22.

The heat air gun 22 further comprises an air flow nozzle 40.

The air flow nozzle 40 of the heat air gun 22 is interchangeably attached to the distal end 34 of the barrel 30 of the heat air gun 22.

The housing 28 of the heat air gun 22 has a rear end 42, and the heat air gun 22 further comprises an air intake 44.

The air intake 44 of the housing 28 of the heat air gun 22 is disposed at the rear end 42 of the housing 28 of the heat air gun 22.

The housing 28 of the heat air gun 22 further has a door 46.

The door 46 of the housing 28 of the heat air gun 22 is hingedly attached, by a hinge assembly 48, to the rear end 42 of the housing 28 of the heat air gun 22, and selectively opens and closes the air intake 44 of the heat air gun 22.

The heat air gun 22 further comprises a foam filter pad 50.

The foam filter pad 50 of the heat air gun 22 is disposed at, and is for filtering air entering, the air intake 44 of the heat air gun 22.

The heat air gun 22 further comprises a motor 52.

The motor 52 of the heat air gun 22 is contained within the housing 28 of the heat air gun 22, and is for drawing cold air into the air intake 44 of the heat air gun 22 and expelling heated air out of the barrel 30 of the heat air gun 22.

The motor 52 of the heat air gun 22 is AC, variable speed, 875 watts, 125 volts, and 15 amps.

The heat air gun 22 further comprises a heating element 53.

The heating element 53 of the heat air gun 22 is contained within the housing 28 of the heat air gun 22, and is for heating the cold air drawn into the air intake 44 of the heat air gun 22 by the motor 52 of the heat air gun 22.

The heat air gun 22 further comprises a first rocker switch 54.

The first rocker switch 54 of the heat air gun 22 is disposed on the handle 32 of the heat air gun, just below the barrel 30 of the heat air gun 22, and is in electrical communication with, and controls heat of, the heating element 53 of the heat air gun 22.

The first rocker switch 54 of the heat air gun 22 has two heat settings, such as medium and high, but is not limited to that.

The heat air gun 22 further comprises a second rocker switch 56.

The second rocker switch 56 of the heat air gun 22 is disposed on the handle 32 of the heat air gun, just below the first rocker switch 54 of the heat air gun 22, and is in electrical communication with, and controls speed of, the motor 52 of the heat air gun 22.

The second rocker switch 56 of the heat air gun 22 has two speed settings in addition to off.

The heat air gun 22 further comprises a base plate 58.

The base plate 58 of the heat air gun 22 is disposed at the distal end 36 of the handle 32 of the heat air gun 22.

The base plate 58 of the heat air gun 22 is flat, generally circular-shaped, and generally perpendicular to the handle 32 of the heat air gun 22 for allowing the heat air gun 22 to stand upright on it own on a flat surface without a need to be held.

The base plate 58 of the heat air gun 22 has a lower free surface 60 and a pair of dovetail mortises 62.

The pair of dovetail mortises 62 of the base plate 58 of the heat air gun 22 extend along the lower free surface 60 of the base plate 58.

The handle 32 of the heat air gun 22 has a rear side 64, and the heat air gun 22 further comprises an electrical cord 66.

The electrical cord 66 of the heat air gun 22 extends out from just above the distal end 36 of the handle 32 of the heat air gun 22, at the rear side 64 of the handle 32 of the heat air gun 22, is in electrical communication with both the motor 52 of the heat air gun 22 and the heating element 53 of the heat air gun 22, and forms a power source interface 68 for electrically communicating with an AC power source 70.

The electrical cord 66 of the heat air gun 22 has a cord strain relief 72.

The cord strain relief 72 of the electrical cord 66 of the heat air gun 22 is disposed at where the electrical cord 66 of the heat air gun 22 exits the handle 32 of the heat air gun 22.

(a) Specific Configuration of the Hinge Assembly 48 of the Heat Air Gun 22.

Figure 6:
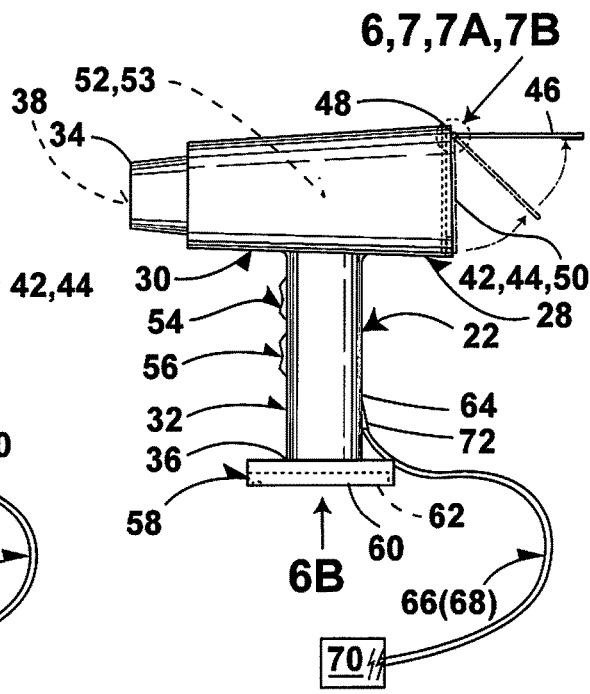
FIG. 6 is an enlarged diagrammatic side elevational view taken generally in the direction of ARROW 6 in FIG. 4 of the heat air gun of the kit of the first embodiment of the present invention.
Figure 6A:
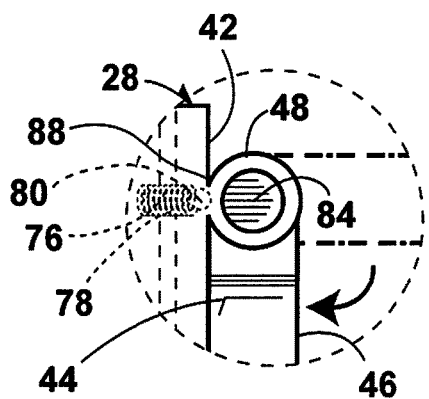
FIG. 6A is an enlarged diagrammatic side elevational view of the area generally enclosed by the dotted circle identified by ARROW 6A in FIG. 6.

The specific configuration of the hinge assembly 48 of the heat air gun 22 can best be seen in FIGS. 6A, 7, 7A, and 7B, which are, respectively, an enlarged diagrammatic side elevational view of the area generally enclosed by the dotted circle identified by ARROW 6A in FIG. 6, an enlarged diagrammatic bottom plan view taken generally in the direction of ARROW 6B in FIG. 6, an enlarged diagrammatic perspective view of the area generally enclosed by the dotted circle identified by ARROW 7 in FIG. 6, an enlarged diagrammatic perspective view of the area generally enclosed by the dotted circle identified by ARROW 7A in FIG. 6, and an enlarged diagrammatic perspective view of the area generally enclosed by the dotted circle identified by ARROW 7B in FIG. 6, and as such, will be discussed with reference thereto.

The hinge assembly 48 of the heat air gun 22 comprises a pair of exterior barrels 74.

The pair of exterior barrels 74 of the hinge assembly 48 of the heat air gun 22 are aligned, are spaced axially apart from each other, and are disposed on the rear end 42 of the housing 28 of the heat air gun 22, above the air intake 44 of the heat air gun 22.

The hinge assembly 48 of the heat air gun 22 further comprises the rear end 42 of the housing 28 of the heat air gun 22 having a blind bore 76.

The blind bore 76 of the rear end 42 of the housing 28 of the heat air gun 22 is disposed between the pair of exterior barrels 74 of the hinge assembly 48 of the heat air gun 22.

The hinge assembly 48 of the heat air gun 22 further comprises a coil spring 78.

The coil spring 78 of the hinge assembly 48 of the heat air gun 22 sits in the blind bore 76 of the rear end 42 of the housing 28 of the heat air gun 22.

The hinge assembly 48 of the heat air gun 22 further comprises a ball 80.

The ball 80 of the hinge assembly 48 of the heat air gun 22 sits on, and is biased outwardly by, the coil spring 78 of the hinge assembly 48 of the heat air gun 22.

The hinge assembly 48 of the heat air gun 22 comprises an interior barrel 82.

The interior barrel 82 of the hinge assembly 48 of the heat air gun 22 is disposed on the door 46 of the housing 28 of the heat air gun 22, and has a length substantially equal to a space between, so as to fit between, the pair of exterior barrels 74 of the hinge assembly 48 of the heat air gun 22.

The hinge assembly 48 of the heat air gun 22 further comprises a pintle 84.

The pintle 84 of the hinge assembly 48 of the heat air gun 22 extends through the interior barrel 82 of the hinge assembly 48 of the heat air gun 22 and out of both sides thereof to form a pair of pintle ends 86.

The pair of pintle ends 86 of the pintle 84 of the hinge assembly 48 of the heat air gun 22 extend through the pair of exterior barrels 74 of the hinge assembly 48 of the heat air gun 22, respectively, so as to allow the door 46 of the housing 28 of the heat air gun 22 to pivot relative to the rear end 42 of the housing 28 of the heat air gun 22.

The interior barrel 82 of the hinge assembly 48 of the heat air gun 22 has a plurality of blind bores 88.

The plurality of blind bores 88 of the interior barrel 82 of the hinge assembly 48 of the heat air gun 22 extend circumferentially therearound, are spaced circumferentially apart, and are aligned with, so as to selectively receive, the ball 80 of the hinge assembly 48 of the heat air gun 22, to thereby lock the door 46 of the housing 28 of the heat air gun 22 in a selective position relative to the rear end 42 of the housing 28 of the heat air gun 22 so as to control the cold air entering the air intake 44 of the heat air gun 22.

(b) Specific Configuration of the Base Plate 58 of the Heat Air Gun 22.

Figure 5:
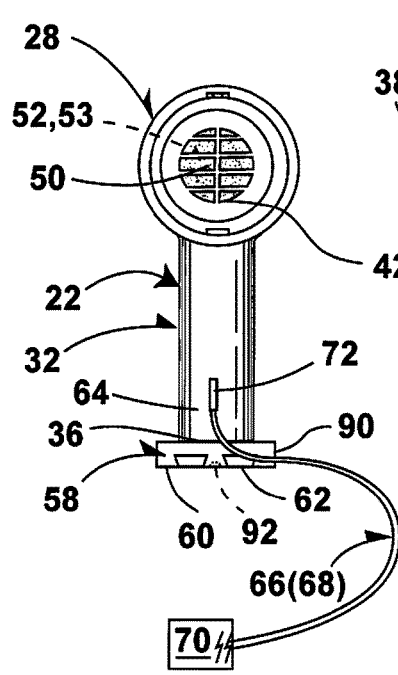
FIG. 5 is an enlarged diagrammatic rear end view taken generally in the direction of ARROW 5 in FIG. 4 of the heat air gun of the kit of the first embodiment of the present invention.
Figure 6B:
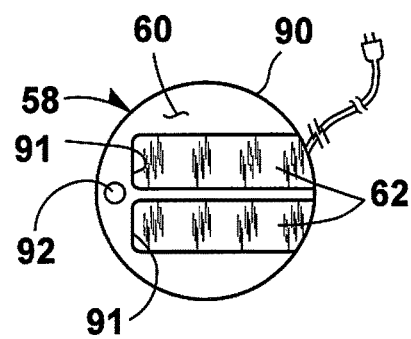
FIG. 6B is an enlarged diagrammatic bottom plan view taken generally in the direction of ARROW 6B in FIG. 6.
Figure 7:
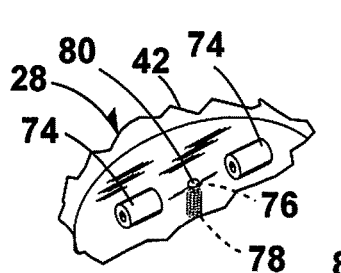
FIG. 7 is an enlarged diagrammatic perspective view of the area generally enclosed by the dotted circle identified by ARROW 7 in FIG. 6.
Figure 7A:
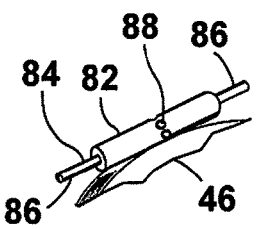
FIG. 7A is an enlarged diagrammatic perspective view of the area generally enclosed by the dotted circle identified by ARROW 7A in FIG. 6.
Figure 7B:
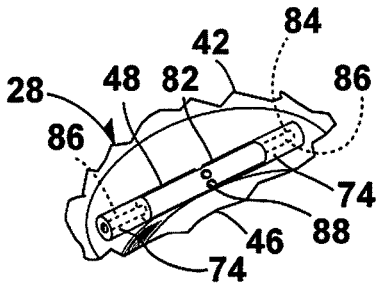
FIG. 7B is an enlarged diagrammatic perspective view of the area generally enclosed by the dotted circle identified by ARROW 7B in FIG. 6.

The specific configuration of the base plate 58 of the heat air gun 22 can best be seen in FIGS. 5 and 6B, which are, respectively, an enlarged diagrammatic rear end view taken generally in the direction of ARROW 5 in FIG. 4 of the heat air gun of the kit of the first embodiment of the present invention, and an enlarged diagrammatic bottom plan view taken generally in the direction of ARROW 6B in FIG. 6, and as such, will be discussed with reference thereto.

The base plate 58 of the heat air gun 22 has a generally circular periphery 90.

The pair of dovetail mortises 62 of the base plate 58 of the heat air gun 22 extend straight along the lower free surface 60 of the base plate 58 of the heat air gun 22, from, and opening into, one side of the generally circular periphery 90 of the base plate 58 of the heat air gun 22 to short of the other side of the generally circular periphery 90 of the base plate 58 of the heat air gun 22 and terminate in a pair of ends 91, respectively.

The base plate 58 of the heat air gun 22 further has a blind bore 92.

The blind bore 92 of the base plate 58 of the heat air gun 22 is disposed on the lower free surface 60 of the base plate 58 of the heat air gun 22, between, and adjacent to, the pair of ends 91 of the pair of dovetail mortises 62 of the base plate 58 of the heat air gun 22.

(2) Specific Configuration of the Tripod 24.

Figure 8A:
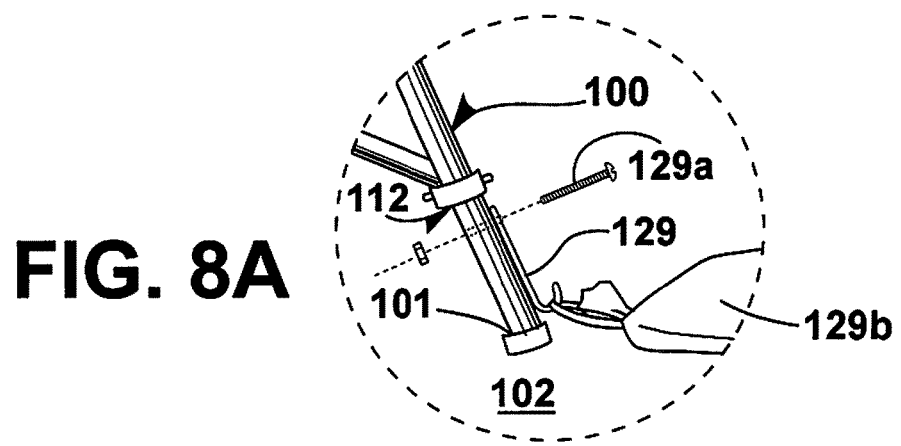
FIG. 8A is an enlarged diagrammatic perspective view of the area generally enclosed by the dotted circle identified by ARROW 8A in FIG. 1.
Figure 8:
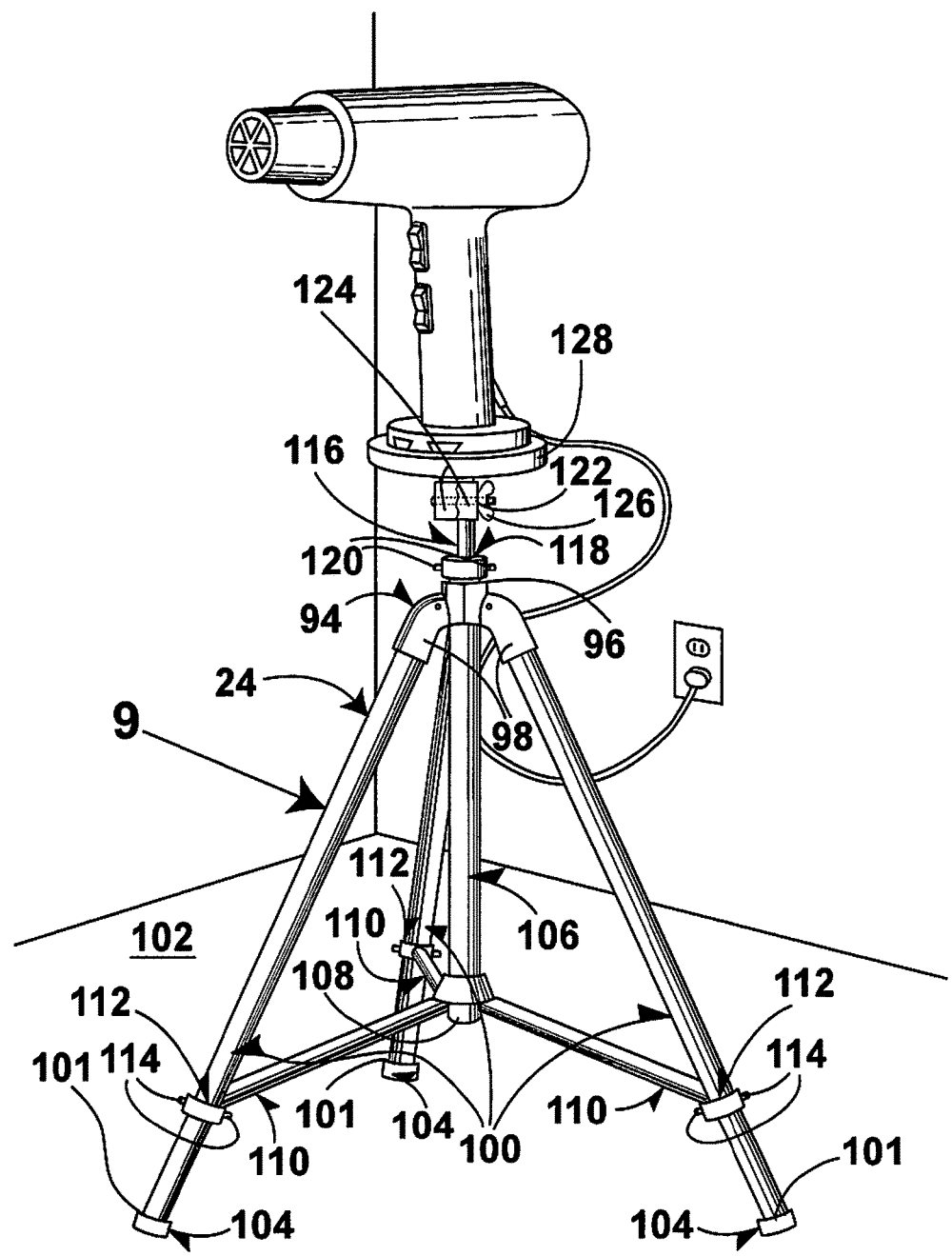
FIG. 8 is a diagrammatic perspective view of the tripod supporting the heat air gun of the kit of the first embodiment of the present invention identified by ARROW 8 in FIG. 1.
Figure 9:
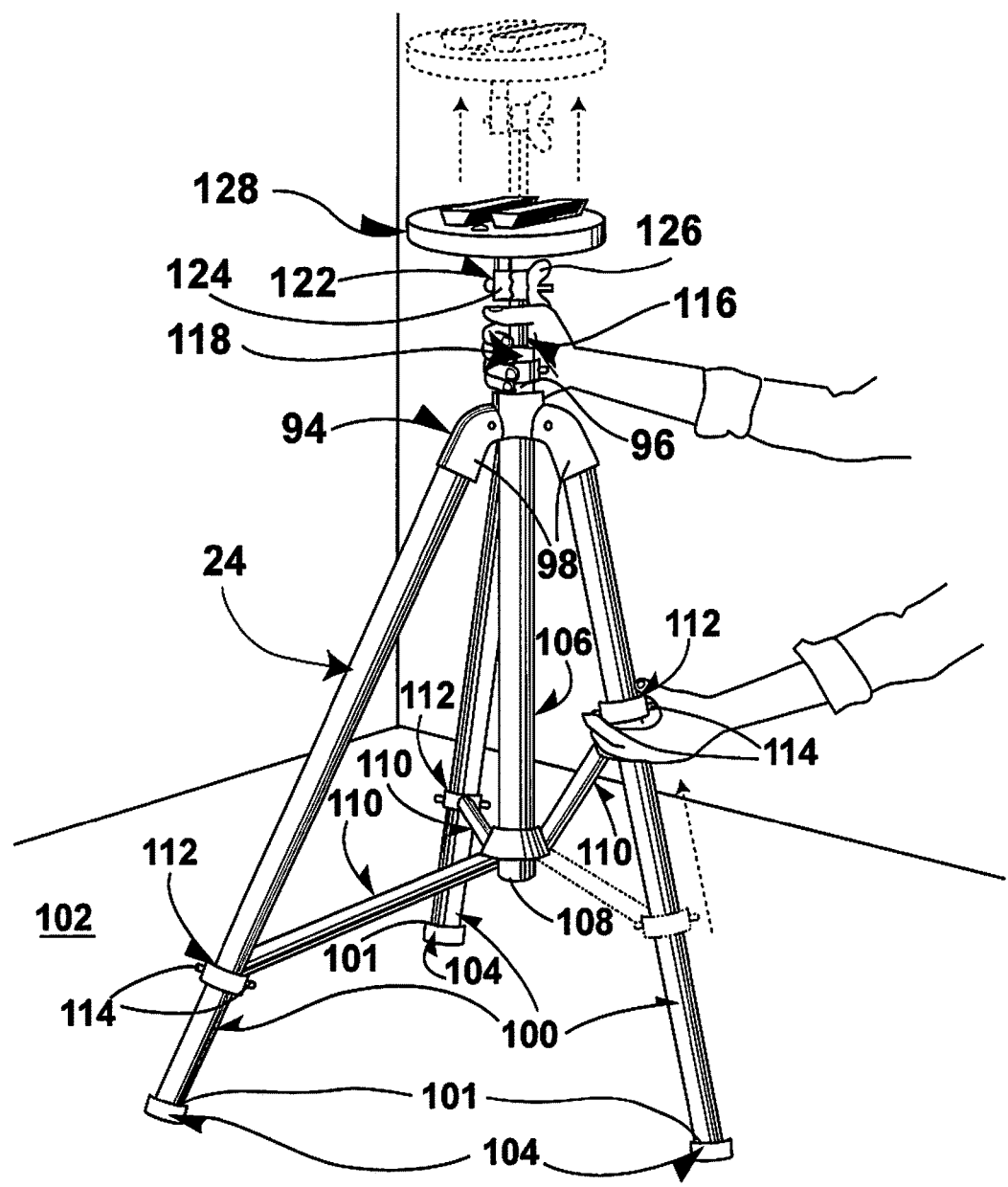
FIG. 9 is a diagrammatic perspective view of the tripod of the kit of the first embodiment of the present invention identified by ARROW 9 in FIG. 8.
Figure 10:
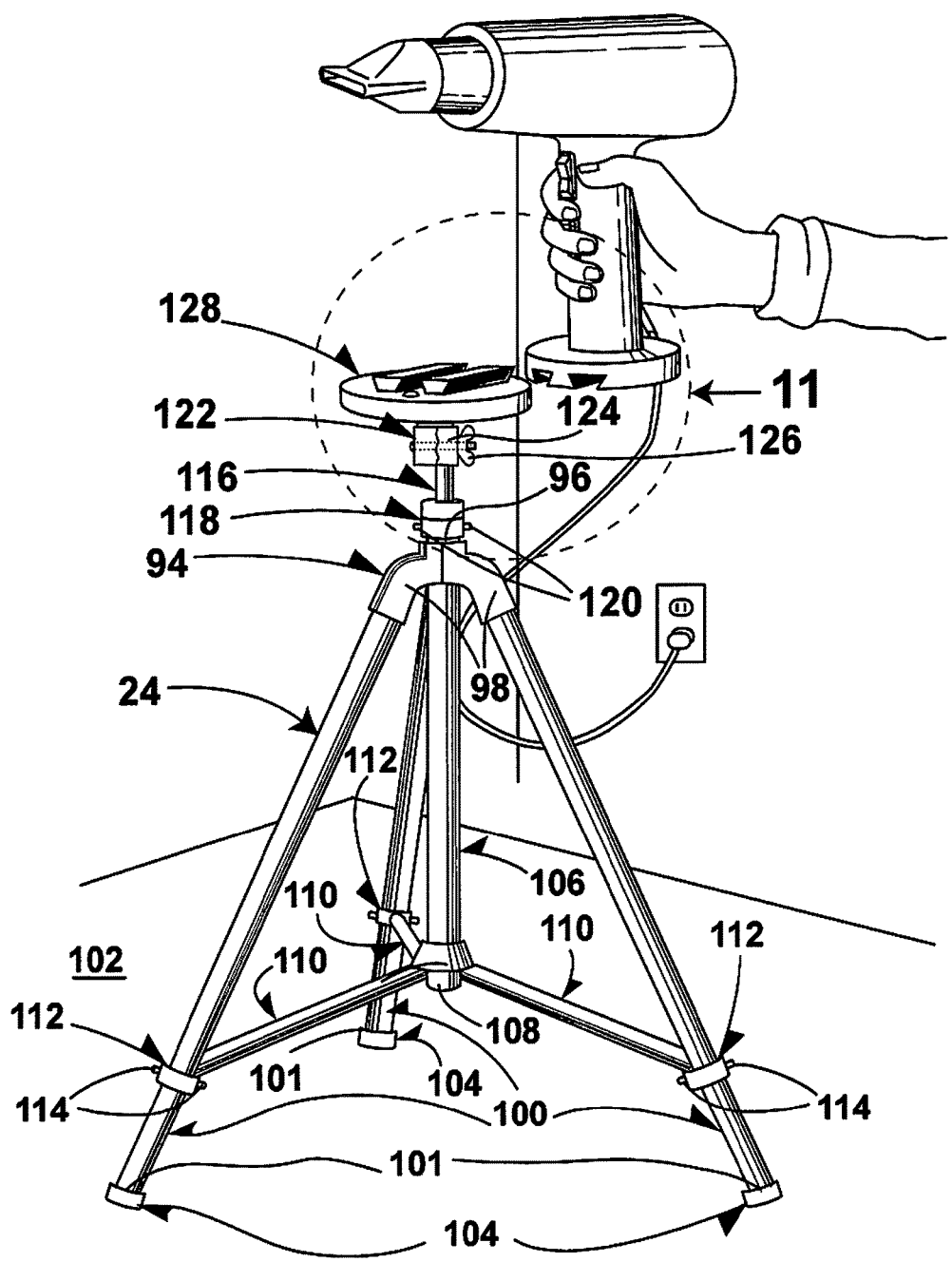
FIG. 10 is an exploded diagrammatic perspective view of the tripod supporting the heat air gun of the kit of the first embodiment of the present invention shown in FIG. 8.

The specific configuration of the tripod 24 can best be seen in FIGS. 8, 9, and 10, which are, respectively, a diagrammatic perspective view of the tripod supporting the heat air gun of the kit of the first embodiment of the present invention identified by ARROW 8 in FIG. 1, a diagrammatic perspective view of the tripod of the kit of the first embodiment of the present invention identified by ARROW 9 in FIG. 8, and an exploded diagrammatic perspective view of the tripod supporting the heat air gun of the kit of the first embodiment of the present invention shown in FIG. 8, and as such, will be discussed with reference thereto.

The tripod 24 comprises a trifucated hip bracket 94.

The trifucated hip bracket 94 of the tripod 24 has a central through bore 96, and three sockets 98.

The three sockets 98 of the trifucated hip bracket 94 of the tripod 24 are pivotable, are spaced-apart equally around the central through bore 96 of the trifucated hip bracket 94 of the tripod 24, and depend slightly outwardly therefrom.

The tripod 24 further comprises three legs 100.

The three legs 100 of the tripod 24 are tubular, engage in, and depend from, the three sockets 98 of the trifucated hip bracket 94 of the tripod 24, respectively, to distal ends 101 for resting on a supporting surface 102.

The tripod 24 further comprises three rubber feet 104.

The three rubber feet 104 of the tripod 24 are disposed on the distal ends 101 of the three legs 100 of the tripod 24, respectively, for increased traction for the tripod 24.

The tripod 24 further comprises a fixed outer center column 106.

The fixed outer center column 106 of the tripod 24 is tubular, and depends from in the central through bore 96 of the trifucated hip bracket 94 of the tripod 24 to a distal end 108.

The tripod 24 further comprises three leg braces 110.

The three leg braces 110 of the tripod 24 are tubular, and extend pivotally from the distal end 108 of the fixed outer center column 106 of the tripod 24 pivotally and slidably to the three legs 100 of the tripod 24, respectively.

The tripod 24 further comprises three lemon squeeze leg locks 112.

The three lemon squeeze leg locks 112 of the tripod 24 pivotally and slidably attach the three leg braces 110 of the tripod 24 to the three legs 100 of the tripod 24, respectively.

Each lemon squeeze leg lock 112 of the tripod 24 has a pair of opposing buttons 114.

The pair of opposing buttons 114 of each lemon squeeze leg lock 112 of the tripod 24, when squeezed, allow an associated leg brace 110 of the tripod 24 to slide up and down an associated leg 100 of the tripod 24.

The tripod 24 further comprises an adjustable inner center column 116.

The adjustable inner center column 116 of the tripod 24 extends telescopically up and down from in the fixed outer center column 106 of the tripod 24 so as to be height adjustable.

The tripod 24 further comprises a lemon squeeze column lock 118.

The lemon squeeze column lock 118 of the tripod 24 is affixed to the fixed outer center column 106 of the tripod 24 from where the fixed outer center column 106 of the tripod 24 emerges from the trifucated hip bracket 94 of the tripod 24 and allows the adjustable inner center column 116 of the tripod 24 to slide in and out of the fixed outer center column 106 of the tripod 24 to adjust height of the adjustable inner center column 116 of the tripod 24.

The lemon squeeze column lock 118 of the tripod 24 has a pair of opposing buttons 120.

The pair of opposing buttons 120 of the lemon squeeze leg lock 118 of the tripod 24, when squeezed, allow the adjustable inner center column 116 of the tripod 24 to slide up and down from within the fixed outer center column 106 of the tripod 24.

The tripod 24 further comprises a selectively rotatable and lockable joint 122.

The selectively rotatable and lockable joint 122 of the tripod 24 extends upwardly from the adjustable inner center column 116 of the tripod 24.

The selectively rotatable and lockable joint 122 of the tripod 24 has a pair of opposing interlocking jaws 124.

The pair of opposing interlocking jaws 124 of the selectively rotatable and lockable joint 122 of the tripod 24 allow the selectively rotatable and lockable joint 122 of the tripod 24 to rotate.

The selectively rotatable and lockable joint 122 of the tripod 24 has a cooperating threaded shaft and wing nut 126.

The cooperating threaded shaft and wing nut 126 of the selectively rotatable and lockable joint 122 of the tripod 24 passes through the pair of opposing interlocking jaws 124 of the selectively rotatable and lockable joint 122 of the tripod 24 and locks the pair of opposing interlocking jaws 124 of the selectively rotatable and lockable joint 122 of the tripod 24 in place once the selectively rotatable and lockable joint 122 of the tripod 24 has been oriented as required.

The tripod 24 further comprises a platform 128.

The platform 128 of the tripod 24 is disposed on the selectively rotatable and lockable joint 122 of the tripod 24, moves therewith, and can replaceably receive the heat air gun 22.

As shown in FIG. 8A, which is an enlarged diagrammatic perspective view of the area generally enclosed by the dotted circle identified by ARROW 8A in FIG. 1, each leg 100 of the tripod 24 has a hook 129.

The hook 129 of each leg 100 of the tripod 24 is screwed by a nut and bolt 129a to the distal end 101 of an associated leg 100 of the tripod 24, is disposed below an associated lemon squeeze leg lock 112 of the tripod 24, and engages a weight 129b for adding stability to the tripod 24.

(a) Specific Configuration of the Platform 128 of the Tripod 24.

Figure 11D:
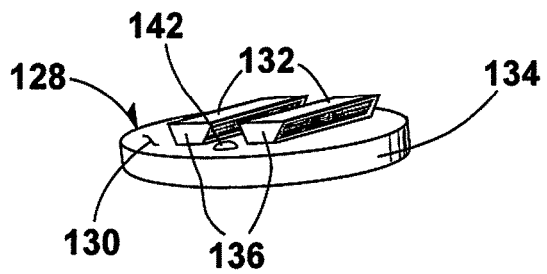
FIG. 11D is an enlarged diagrammatic perspective view of the platform of the kit of the first embodiment of the present invention identified by ARROW 11D in FIG. 11B.
Figure 11B:
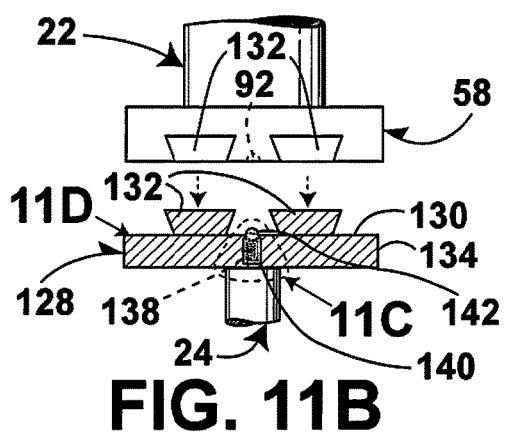
FIG. 11B is an enlarged diagrammatic front view partially in cross section taken generally in the direction of ARROW 11B in FIG. 11A.
Figure 11C:
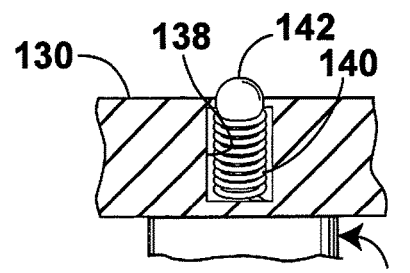
FIG. 11C is an enlarged diagrammatic cross sectional view of the area generally enclosed by the dotted curve identified by ARROW 11C in FIG. 11B.
Figure 11:
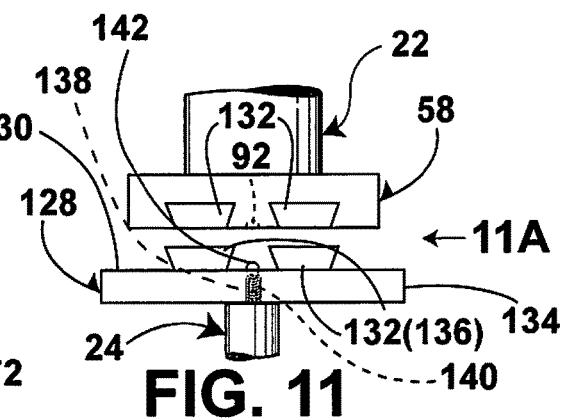
FIG. 11 is an enlarged diagrammatic front view of the area generally enclosed by the dotted circle identified by ARROW 11 in FIG. 10.
Figure 11A:
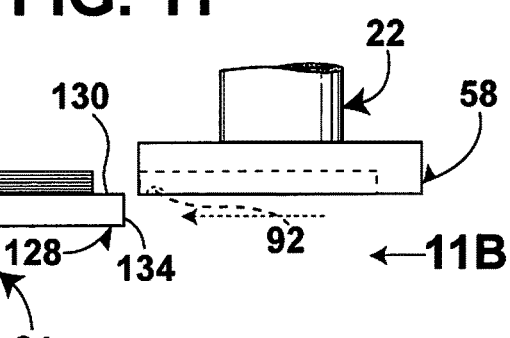
FIG. 11A is an enlarged diagrammatic side elevational view of the area generally enclosed by the dotted circle identified by ARROW 11A in FIG. 10.

The specific configuration of the platform 128 can best be seen in FIGS. 11, 11A, 11B, 11C, and 11D, which are, respectively, an enlarged diagrammatic front view of the area generally enclosed by the dotted circle identified by ARROW 11 in FIG. 10, an enlarged diagrammatic side elevational view of the area generally enclosed by the dotted circle identified by ARROW 11A in FIG. 10, an enlarged diagrammatic front view partially in cross section taken generally in the direction of ARROW 11B in FIG. 11A, an enlarged diagrammatic cross sectional view of the area generally enclosed by the dotted curve identified by ARROW 11C in FIG. 11B, and an enlarged diagrammatic perspective view of the platform of the kit of the first embodiment of the present invention identified by ARROW 11D in FIG. 11B, and as such, will be discussed with reference thereto.

The platform 128 of the tripod 24 is flat, generally circular-shaped, and generally perpendicular to the selectively rotatable and lockable joint 122 of the tripod 24.

The platform 128 of the tripod 24 has an upper free surface 130 and a pair of dovetail tenons 132.

The pair of dovetail tenons 132 of the platform 128 of the tripod 24 extend along the upper free surface 130 of the platform 128 of the tripod 24.

The platform 128 of the tripod 24 has a generally circular periphery 134.

The pair of dovetail mortises 132 of the platform 128 of the tripod 24 extend straight along the upper free surface 130 of the platform 128 of the tripod 24, from short of one side of the generally circular periphery 134 of the platform 128 of the tripod 24 to short of the other side of the generally circular periphery 134 of the platform 128 of the tripod 24, and terminate in a pair of ends 136, respectively.

The platform 128 of the tripod 24 further has a blind bore 138.

The blind bore 138 of the platform 128 of the tripod 24 is disposed on the upper free surface 130 of the platform 128 of the tripod 24, between, and adjacent to, the pair of ends 136 of the pair of dovetail mortises 132 of the platform 128 of the tripod 24.

The platform 128 of the tripod 24 further comprises a coil spring 140.

The coil spring 140 of the platform 128 of the tripod 24 sits in the blind bore 138 of the platform 128 of the tripod 24.

The platform 128 of the tripod 24 further comprises a ball 142.

The ball 142 of the platform 128 of the tripod 24 sits on, and is biased outwardly by, the coil spring 140 of the platform 128 of the tripod 24.

(3) Method of Attaching the Heat Air Gun 22 to the Tripod 24.

Slide the base plate 58 of the heat air gun 22 onto the platform 128 of the tripod 24, with the pair of dovetail tenons 132 of the platform 128 of the tripod 24 engaging in the pair of dovetail mortises 132 of the base plate 58 of the heat air gun 22, respectively, until the ball 142 of the platform 128 of the tripod 24 is biased into the blind bore 92 of the base plate 58 of the heat air gun 22 thereby replaceably fitting the base plate 58 and the platform 128 together easily and conveniently.

(4) Specific Configuration of the Extension Arm 26.

Figure 12:
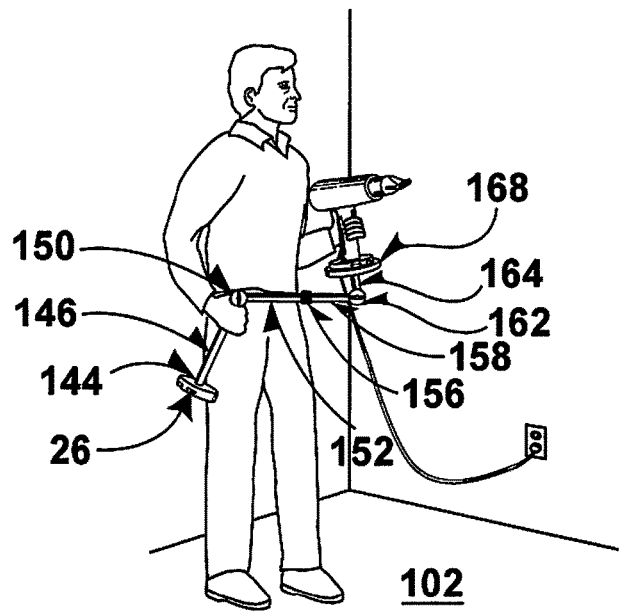
FIG. 12 is a reduced diagrammatic perspective view of the extension arm supporting the heat air gun of the kit of the first embodiment of the present invention identified by ARROW 12 in FIG. 1.
Figure 13:
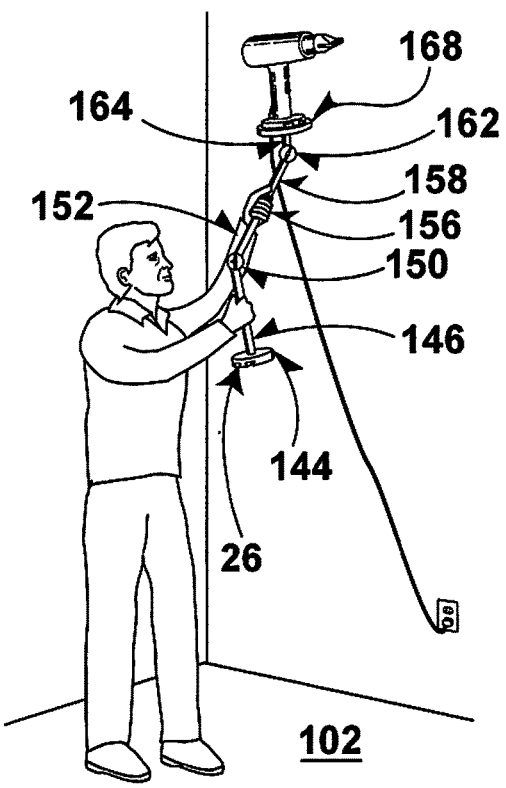
FIG. 13 is a reduced diagrammatic perspective view of the extension arm supporting the heat air gun of the kit of the first embodiments of the present invention identified by ARROW 13 in FIG. 1.
Figure 14:
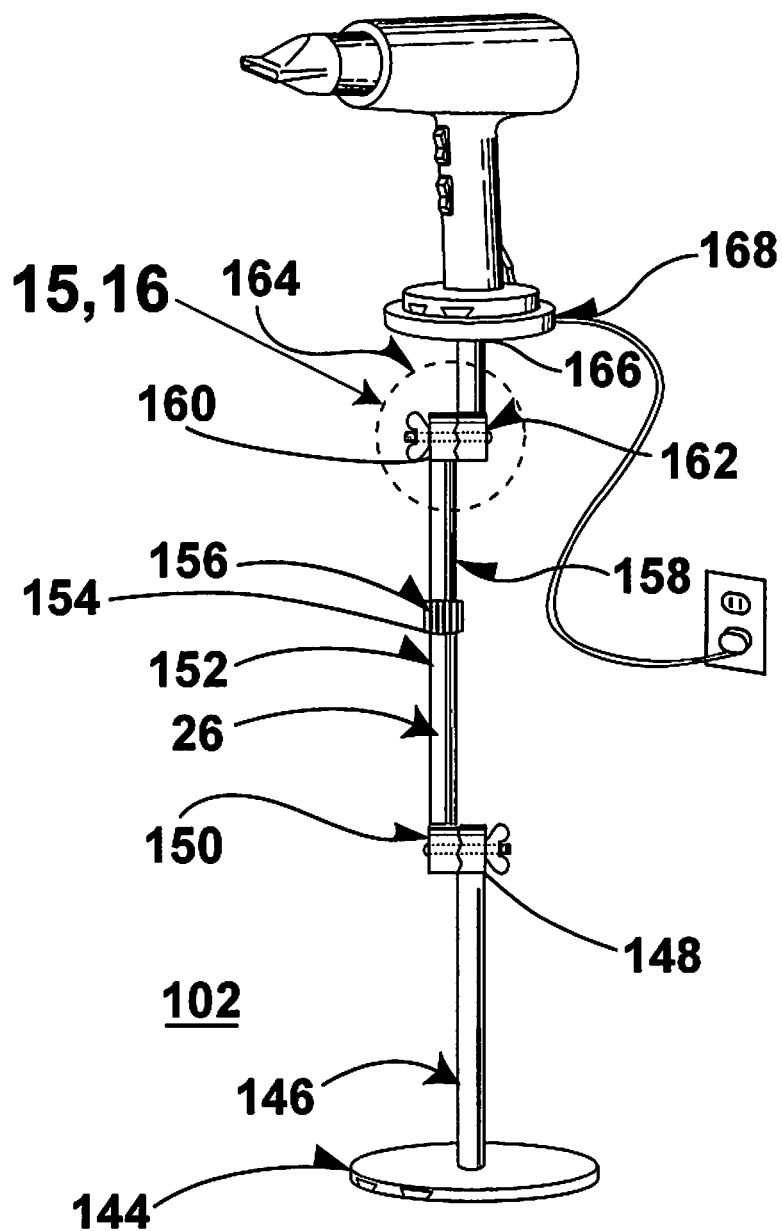
FIG. 14 is an enlarged diagrammatic perspective view of the extension arm supporting the heat air gun of the kit of the first embodiment of the present invention identified by ARROW 14 in FIG. 13.

The specific configuration of the extension arm 26 can best be seen in FIGS. 12, 13, and 14, which are, respectively, a reduced diagrammatic perspective view of the extension arm supporting the heat air gun of the kit of the first embodiment of the present invention identified by ARROW 12 in FIG. 1, a reduced diagrammatic perspective view of the extension arm supporting the heat air gun of the kit of the first embodiments of the present invention identified by ARROW 13 in FIG. 1, and an enlarged diagrammatic perspective view of the extension arm supporting the heat air gun of the kit of the first embodiment of the present invention identified by ARROW 14 in FIG. 13, and as such, will be discussed with reference thereto.

The extension arm 26 comprises a base plate 144.

The base plate 144 of the extension arm 26 is similar to the base plate 58 of the heat air gun 22, and is either free, attached to the platform 128 of the tripod 24, or is for resting on the supporting surface 102.

The extension arm 26 further comprises a lower fixed pole 146.

The lower fixed pole 146 of the extension arm 26 extends perpendicularly from the base plate 144 of the extension arm 26 to a distal end 148.

The extension arm 26 further comprises a selectively rotatable and lockable lower joint 150.

The selectively rotatable and lockable lower joint 150 of the extension arm 26 is disposed at the distal end 148 of the lower fixed pole 146 of the extension arm 26.

The extension arm 26 further comprises an outer upper pole 152.

The outer upper pole 152 of the extension arm 26 extends pivotally from the selectively rotatable and lockable lower joint 150 of the extension arm 26 to a distal end 154.

The extension arm 26 further comprises a twist lock locking mechanism 156.

The twist lock locking mechanism 156 of the extension arm 26 is coaxially affixed to the distal end 154 of the outer upper pole 152 of the extension arm 26.

The extension arm 26 further comprises an inner upper pole 158.

The inner upper pole 158 of the extension arm 26 extends length adjustably from the twist lock locking mechanism 156 of the extension arm 26 to a distal end 160.

The extension arm 26 further comprises a selectively rotatable and lockable upper joint 162.

The selectively rotatable and lockable upper joint 162 of the extension arm 26 is disposed at the distal end 160 of the inner upper pole 158 of the extension arm 26.

The extension arm 26 further comprises a neck 164.

The neck 164 of the extension arm 26 extends pivotally from the selectively rotatable and lockable upper joint 162 of the extension arm 26 to a distal end 166.

The extension arm 26 further comprises a platform 168.

The platform 168 of the extension arm 26 is perpendicularly affixed to the distal end 166 of the neck 164 of the extension arm 26, and is similar to the platform 128 of the tripod 24.

(a) Specific Configuration of Each of the Selectively Rotatable and Lockable Lower Joint 150 of the Extension Arm 26 and the Selectively Rotatable and Lockable Upper Joint 162 of the Extension Arm 26.

Figure 15:
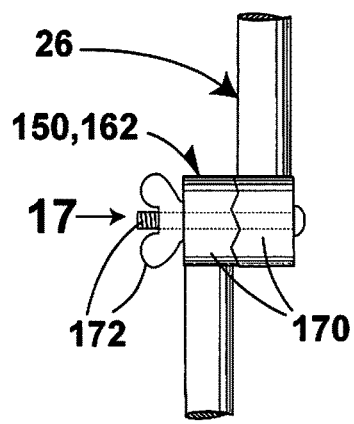
FIG. 15 is an enlarged diagrammatic side elevational view of the area generally enclosed by the dotted circle identified by ARROW 15 in FIG. 14.
Figure 16:
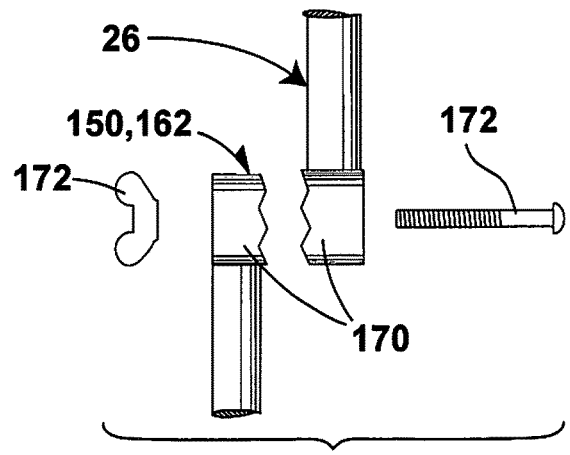
FIG. 16 is an enlarged and exploded diagrammatic side elevational view of the area generally enclosed by the dotted circle identified by ARROW 16 in FIG. 14.
Figure 17:
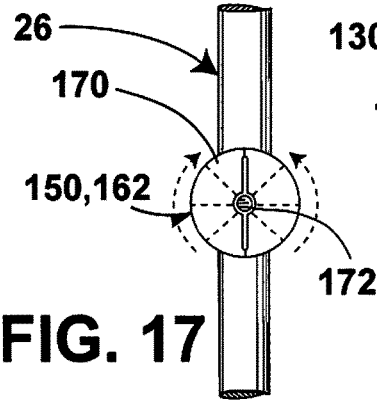
FIG. 17 is a diagrammatic elevational view taken generally in the direction of ARROW 17 in FIG. 15.

The specific configuration of each of the selectively rotatable and lockable lower joint 150 of the extension arm 26 and the selectively rotatable and lockable upper joint 162 of the extension arm 26 can best be seen in FIGS. 15, 16, and 17, which are, respectively, an enlarged diagrammatic side elevational view of the area generally enclosed by the dotted circle identified by ARROW 15 in FIG. 14, an enlarged and exploded diagrammatic side elevational view of the area generally enclosed by the dotted circle identified by ARROW 16 in FIG. 14, and a diagrammatic elevational view taken generally in the direction of ARROW 17 in FIG. 15, and as such, will be discussed with reference thereto.

Each of the selectively rotatable and lockable lower joint 150 of the extension arm 26 and the selectively rotatable and lockable upper joint 162 of the extension arm 26 has a pair of opposing interlocking jaws 170.

The pair of opposing interlocking jaws 170 of each of the selectively rotatable and lockable lower joint 150 of the extension arm 26 and the selectively rotatable and lockable upper joint 162 of the extension arm 26 allow the selectively rotatable and lockable lower joint 150 of the extension arm 26 and the selectively rotatable and lockable upper joint 162 of the extension arm 26 to rotate.

Each of the selectively rotatable and lockable lower joint 150 of the extension arm 26 and the selectively rotatable and lockable upper joint 162 of the extension arm 26 further has a cooperating threaded shaft and wing nut 172.

The cooperating threaded shaft and wing nut 172 of each of the selectively rotatable and lockable lower joint 150 of the extension arm 26 and the selectively rotatable and lockable upper joint 162 of the extension arm 26 passes through the pair of opposing interlocking jaws 170 of an associated one of the selectively rotatable and lockable lower joint 150 of the extension arm 26 and the selectively rotatable and lockable upper joint 162 of the extension arm 26, and locks the pair of opposing interlocking jaws 170 of the associated one of the selectively rotatable and lockable lower joint 150 of the extension arm 26 and the selectively rotatable and lockable upper joint 162 of the extension arm 26 in place once the associated one of the selectively rotatable and lockable lower joint 150 of the extension arm 26 and the selectively rotatable and lockable upper joint 162 of the extension arm 26 has been oriented as required.

C Overall Configuration of the Second Embodiment of the Kit 220.

Figure 22:
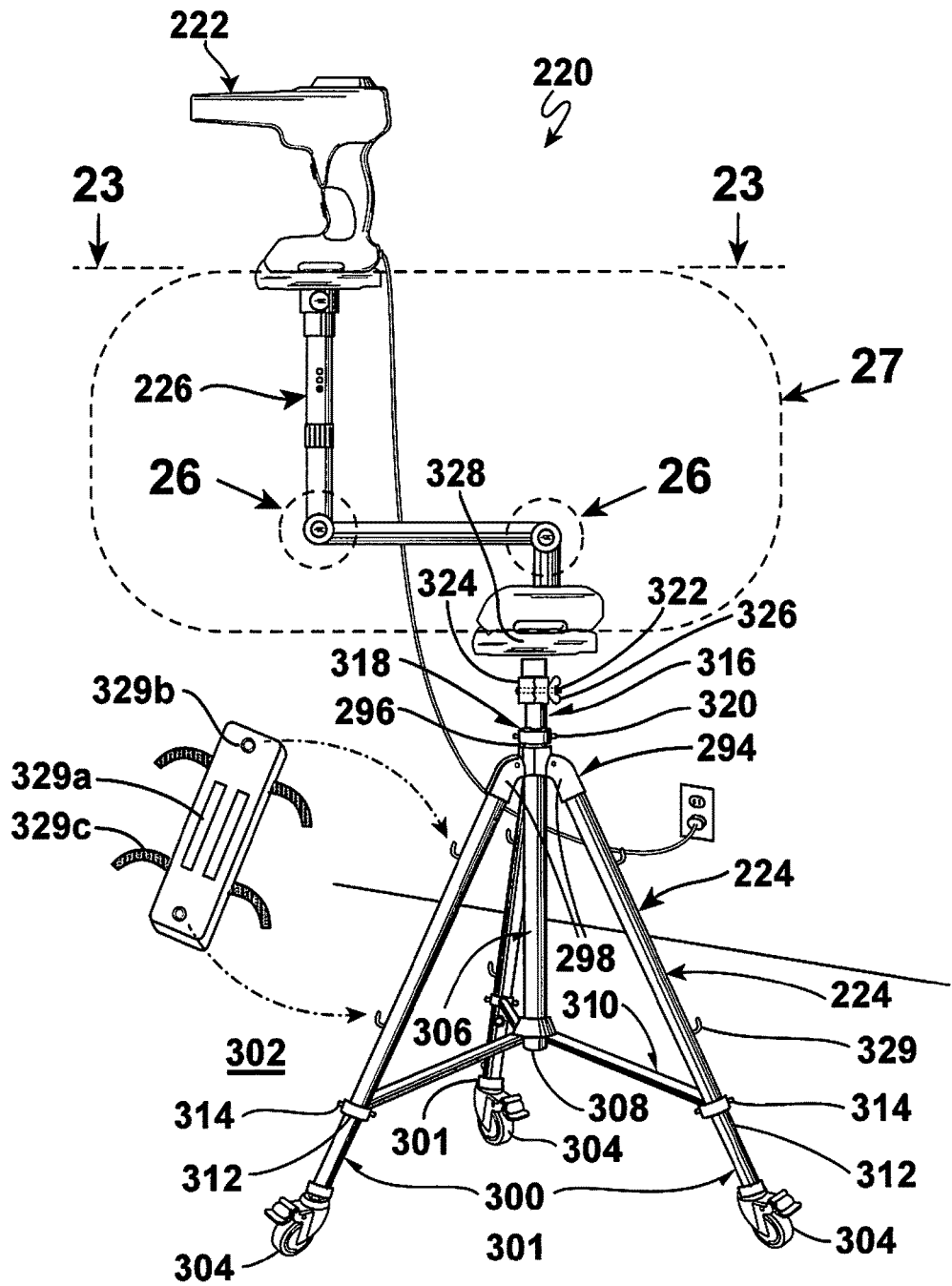
FIG. 22 is a diagrammatic perspective view of the kit of the second embodiment of the present invention supporting and multi-directionally aiming a heat source.

Referring now to FIG. 22, which is a diagrammatic perspective view of the kit of a second embodiment of the present invention supporting and multi-directionally aiming a heat source, the kit of the second embodiment of the present invention is shown generally at 220 for supporting and multi-directionally aiming a heat source.

The kit comprises a heat air gun 222, a tripod 224, and an extension arm 226. The tripod 224 and/or the extension arm 226 support(s) the heat air gun 222 so as to allow the heat air gun 222 to be supported while having multi-directional aiming.

(1) Specific Configuration of the Heat Air Gun 222.

Figure 18:
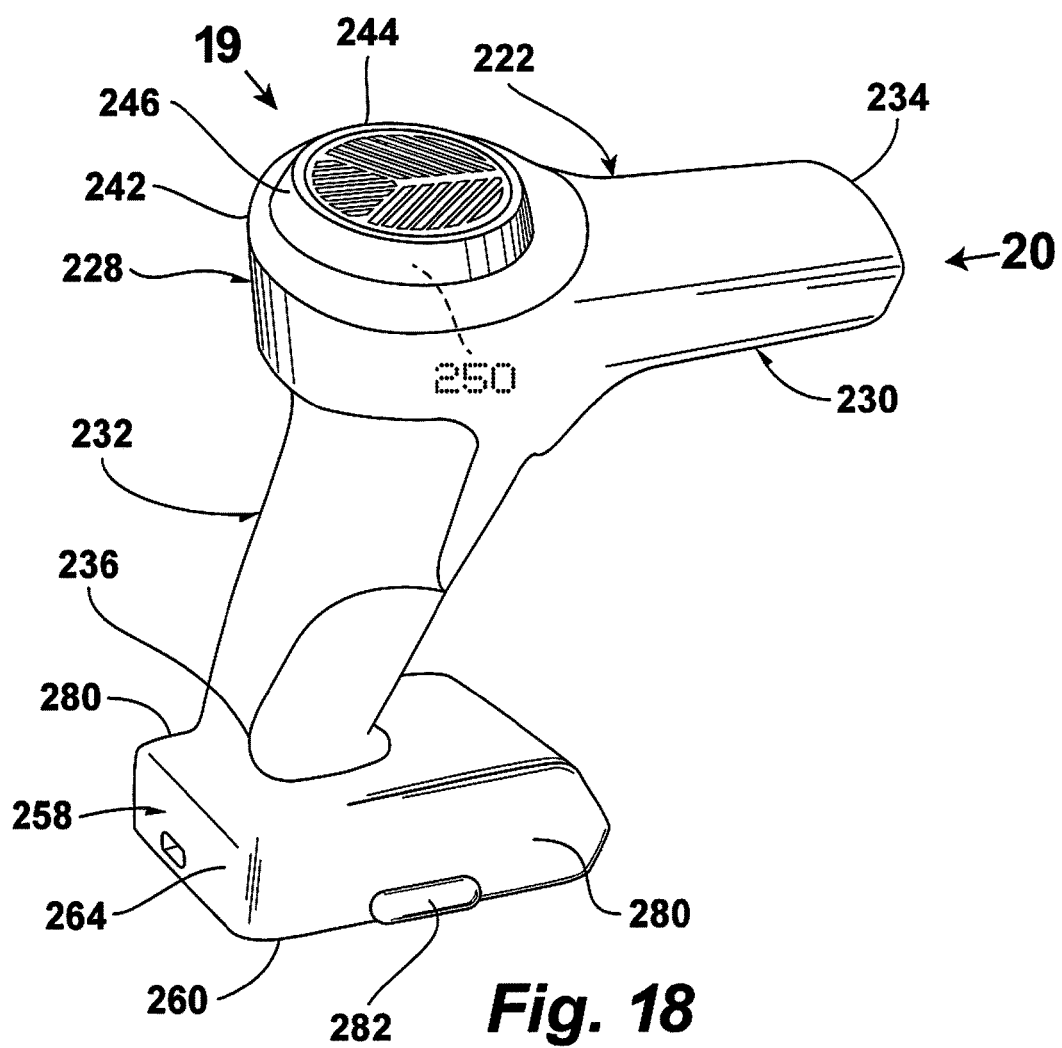
FIG. 18 is an enlarged diagrammatic perspective view of a heat air gun of the kit of a second embodiment of the present invention.
Figure 19:
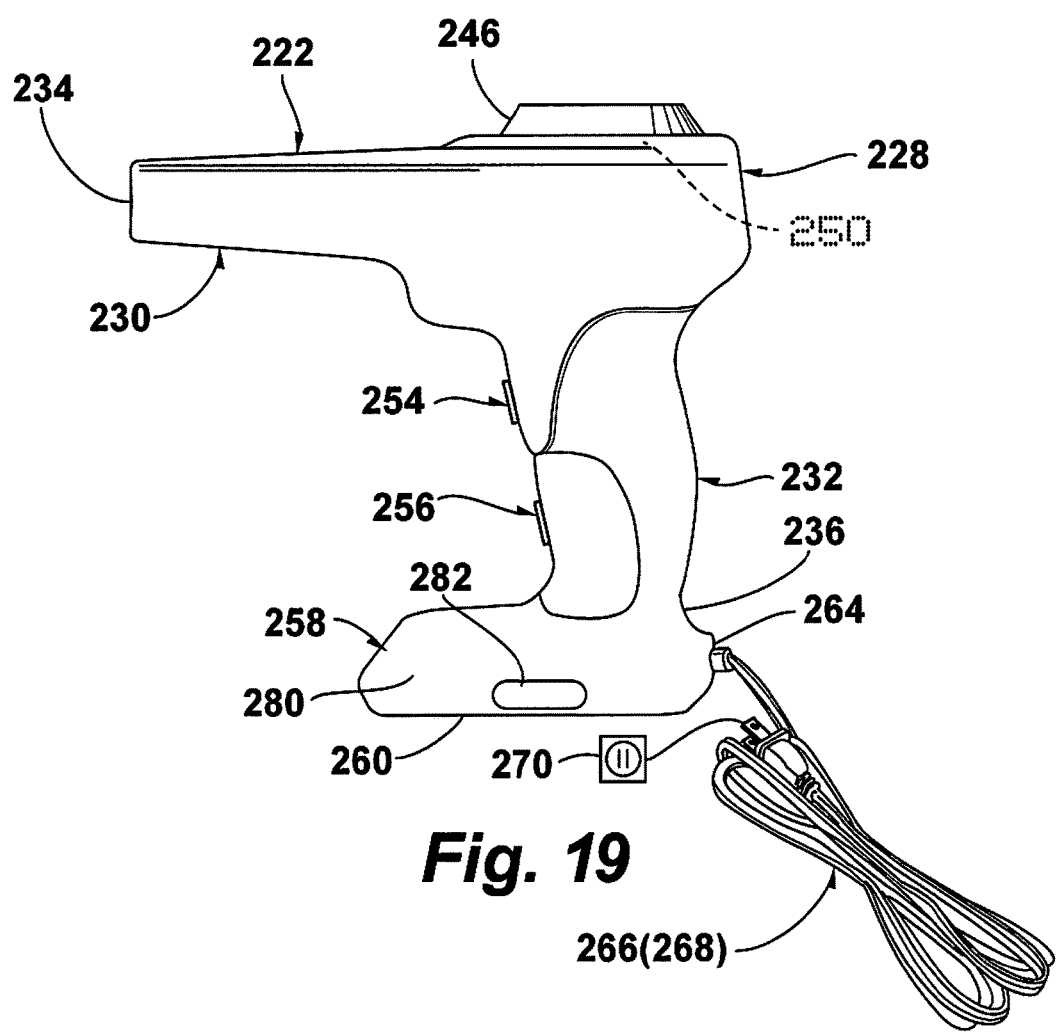
FIG. 19 is a side elevational view thereof, taken in the direction of ARROW 19 in FIG. 18.
Figure 20:
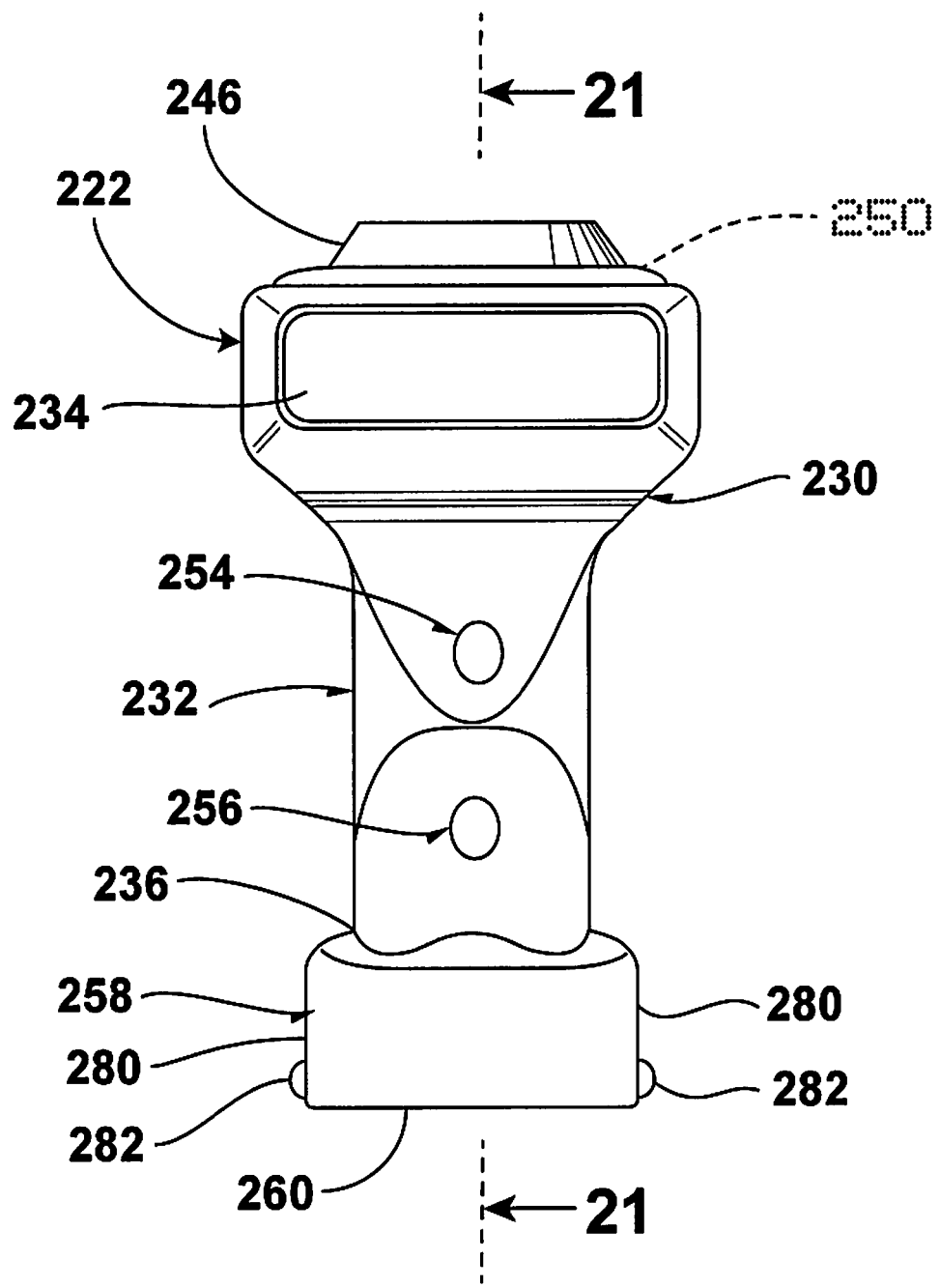
FIG. 20 is a front elevational view thereof, taken in the direction of ARROW 20 in FIG. 18.

The specific configuration of the heat air gun 222 can best be seen in FIGS. 18, 19, 20, and 21, which are, respectively, an enlarged diagrammatic perspective view of a heat air gun of the kit of a second embodiment of the present invention, a side elevational view thereof, taken in the direction of ARROW 19 in FIG. 18, a front elevational view thereof, taken in the direction of ARROW 20 in FIG. 18, and a diagrammatic cross sectional view taken on LINE 21-21 in FIG. 20, and as such, will be discussed with reference thereto.

The heat air gun 222 comprises a housing 228, a nozzle 230, and a handle 232.

The nozzle 320 of the heat air gun 222 extends generally horizontally from the housing 228 of the heat air gun 222 to a distal end 234, and has a generally oval lateral cross section for maximizing air volume exiting the heat air gun 222.

The handle 232 of the heat air gun 222 depends generally perpendicularly from the housing 232 of the heat air gun 222 to a distal end 236.

The housing 228 of the heat air gun 222 has an upper rear end 242, and the heat air gun 222 further comprises an air intake 244.

The air intake 244 of the housing 228 of the heat air gun 222 is disposed at the upper rear end 242 of the housing 228 of the heat air gun 222.

The air intake 244 of the heat air gun 222 has a vented twist-on cap 246.

The vented twist-on cap 246 of the air intake 244 of the heat air gun 222 is threadably attached to the upper rear end 242 of the housing 228 of the heat air gun 222.

The air intake 244 of the heat air gun 222 further has a replaceable paper filter 250.

The replaceable paper filter 250 of the air intake 244 of the heat air gun 222 is disposed under, and is for filtering air entering, the vented twist on cap 246 of the air intake 244 of the heat air gun 222.

The heat air gun 222 further comprises a motor 252 and an impeller 252a.

The motor 252 of the heat air gun 222 is contained within the housing 228 of the heat air gun 222, and spins the impeller 252a for drawing cold air into the air intake 244 of the heat air gun 222 and expelling heated air out of the nozzle 230 of the heat air gun 222.

The motor 252 of the heat air gun 222 is variable speed, 875 watts, 125 volts, and 15 amps.

The heat air gun 222 further comprises heating element coils 253.

The heating element coils 253 of the heat air gun 222 are contained within the nozzle 230 of the heat air gun 222, and are for heating the cold air drawn into the air intake 244 of the heat air gun 222 by the motor 252 of the heat air gun 222.

The heat air gun 222 further comprises a first rocker switch 254.

The first rocker switch 254 of the heat air gun 222 is disposed on the handle 232 of the heat air gun 222, just below the nozzle 230 of the heat air gun 222, and is in electrical communication with, and controls heat of, the heating element 253 of the heat air gun 222.

The first rocker switch 254 of the heat air gun 222 has two heat settings, such as medium and high, but is not limited to that.

The heat air gun 222 further comprises a second rocker switch 256.

The second rocker switch 256 of the heat air gun 222 is disposed on the handle 232 of the heat air gun 222, just below the first rocker switch 254 of the heat air gun 222, and is in electrical communication with, and controls speed of, the motor 252 of the heat air gun 222.

The second rocker switch 256 of the heat air gun 222 has two speed settings in addition to off.

The heat air gun 222 further comprises a base 258.

The base 258 of the heat air gun 222 is disposed at the distal end 236 of the handle 232 of the heat air gun 222.

The base 258 of the heat air gun 222 is generally perpendicular to the handle 232 of the heat air gun 222.

The base 258 of the heat air gun 222 has a lower free surface 260 for allowing the heat air gun 222 to stand upright on its own on a flat surface without a need to be held.

Figure 21:
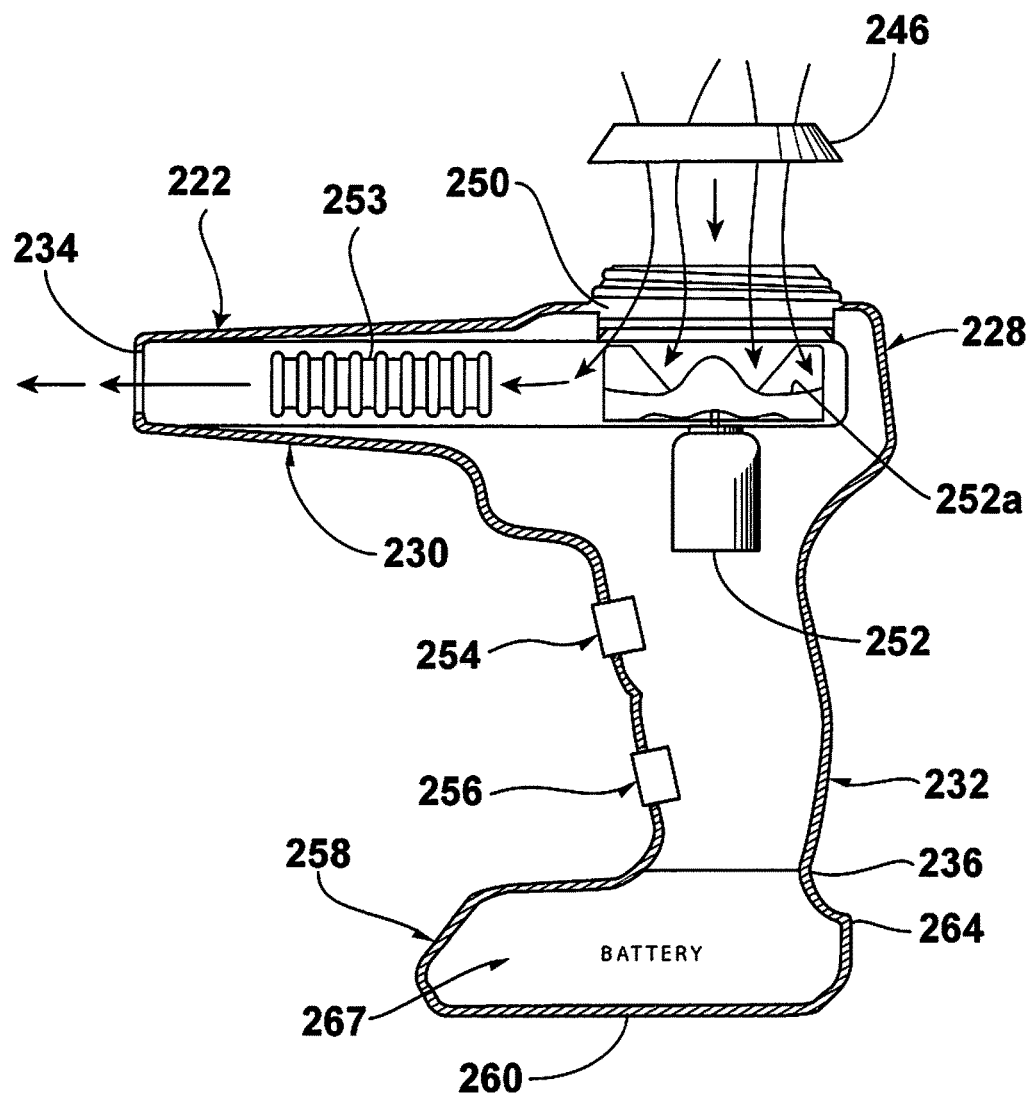
FIG. 21 is a diagrammatic cross sectional view taken on LINE 21-21 in FIG. 20.

The base 232 of the heat air gun 222 further has a rear side 264, and the heat air gun 222 further comprises either an electrical cord 266 or a battery pack 267 (FIG. 21).

The electrical cord 266 of the heat air gun 222 extends out from the rear side 264 of the handle 232 of the heat air gun 222, is in electrical communication with both the motor 252 of the heat air gun 222 and the heating element 253 of the heat air gun 222, and forms a power source interface 268 for electrically communicating with an AC power source 270.

(a) Specific Configuration of the Base 258 of the Heat Air Gun 222.

Figure 23:
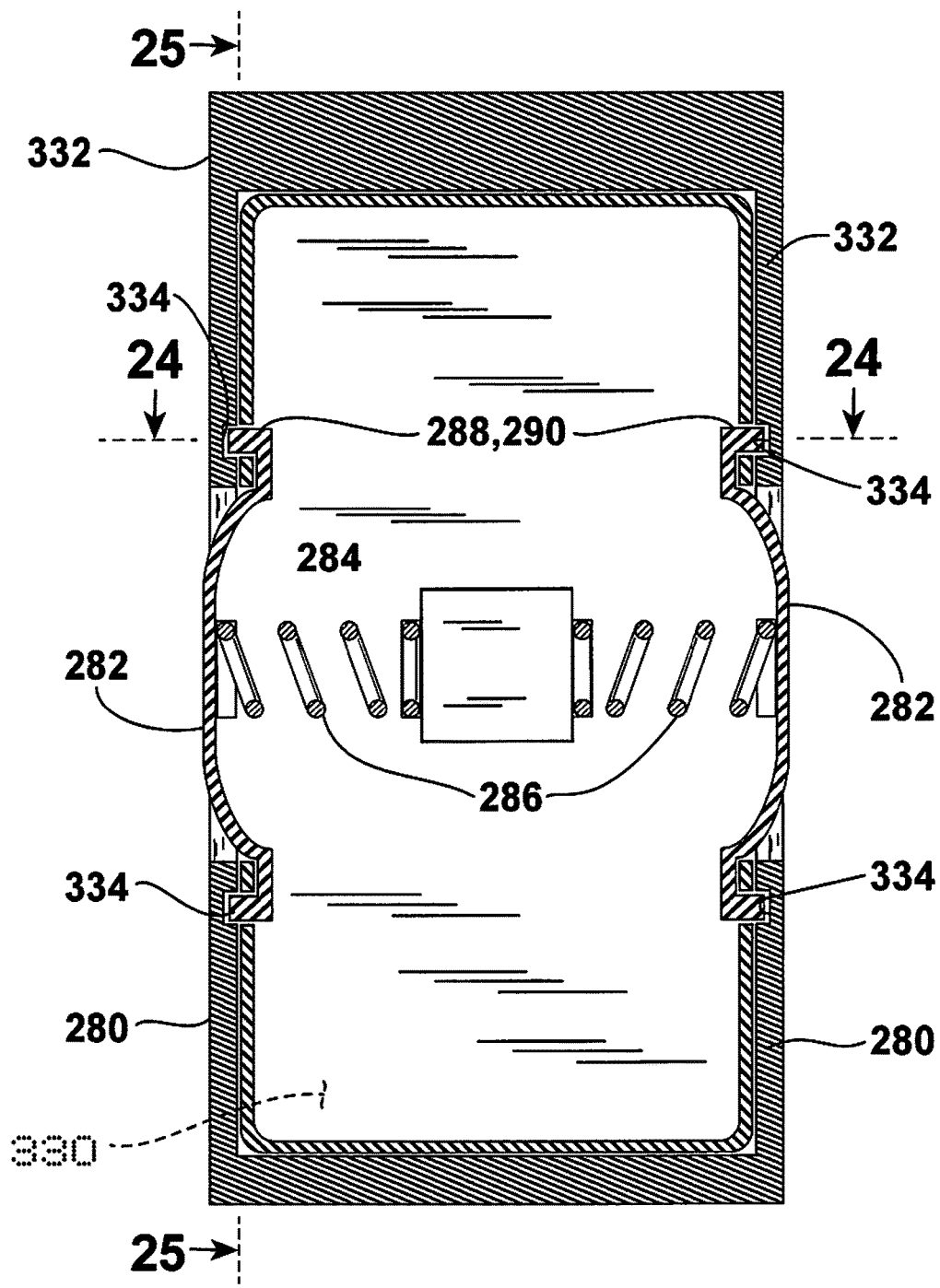
FIG. 23 is a cross sectional view taken on LINE 23-23 in FIG. 22 with some parts omitted for clarity.
Figure 24:
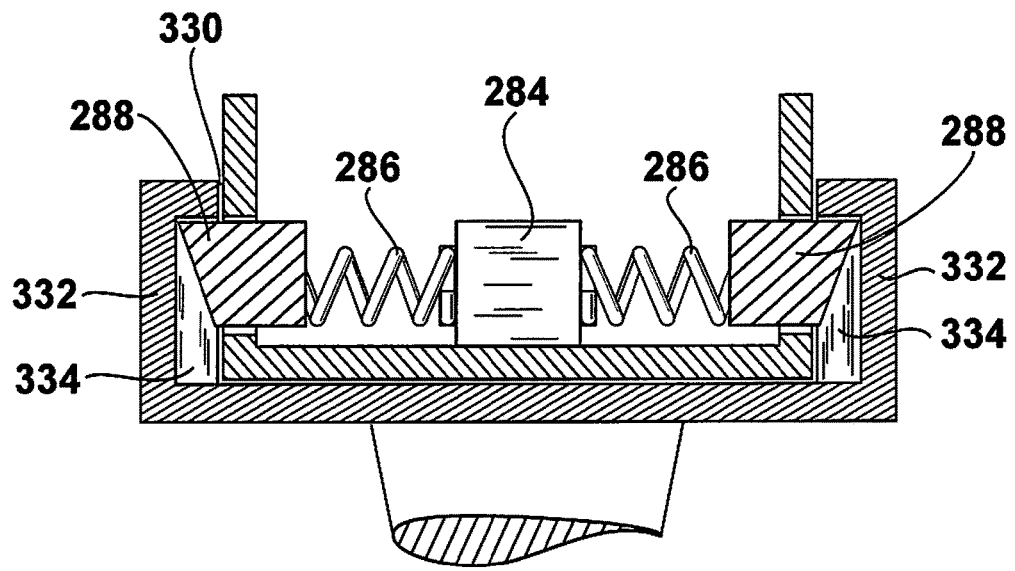
FIG. 24 is a cross sectional view taken on LINE 24-24 in FIG. 23 with some parts omitted for clarity.
Figure 25:
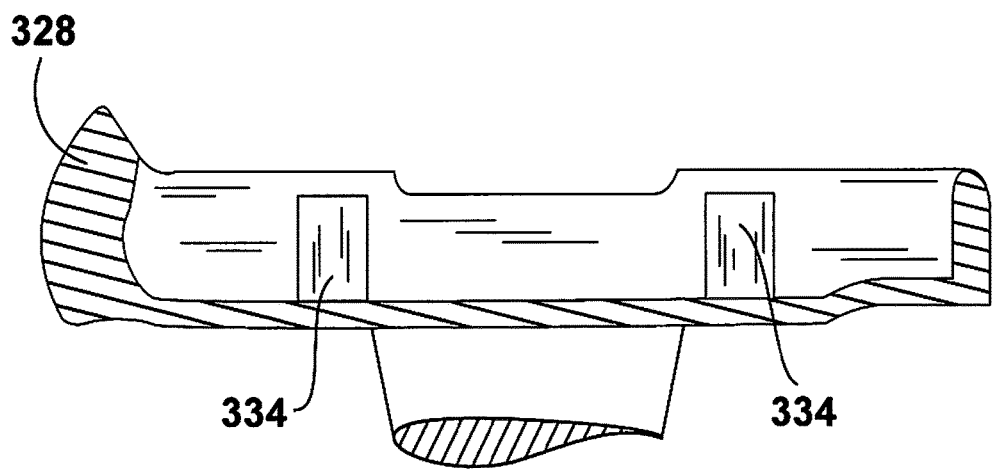
FIG. 25 is a partial cross sectional view taken on LINE 25-25 in FIG. 23, with some parts omitted for clarity, of just the support base which holds a heat air gun.

The specific configuration of the base 258 of the heat air gun 222 can best be seen in FIGS. 18, 19, 20, 23, 24, and 25, which are, respectively, an enlarged diagrammatic perspective view of a heat air gun of the kit of a second embodiment of the present invention, a side elevational view thereof, taken in the direction of ARROW 19 in FIG. 18, a front elevational view thereof, taken in the direction of ARROW 20 in FIG. 18, a cross sectional view taken on LINE 23-23 in FIG. 22 with some parts omitted for clarity, a cross sectional view taken on LINE 24-24 in FIG. 23 with some parts omitted for clarity, and a partial cross sectional view taken on LINE 25-25 in FIG. 23, with some parts omitted for clarity, of just the support base which holds a heat air gun, and as such, will be discussed with reference thereto.

The base 258 of the heat air gun 222 further has a pair of opposite sides 280 and a pair of push buttons 282.

The pair of push buttons 282 of the base 258 of the heat air gun 222 are operatively connected through the pair of opposite sides 280 of the base 258 of the heat air gun 222, respectively.

The base 258 of the heat air gun 222 further has a central spring seat 284.

The central spring seat 284 of the base 258 of the heat air gun 222 is fixedly attached within the base 258 of the heat air gun 222, equidistantly between, and in alignment with, the pair of push buttons 282 of the base 258 of the heat air gun 222.

The base 258 of the heat air gun 222 further has a pair of coil springs 286.

The pair of coil springs 286 of the base 258 of the heat air gun 222 extend from opposite sides of the central spring seat 284 of the base 258 of the heat air gun 222 to the pair of push buttons 282 of the base 258 of the heat air gun 222, respectively, and in so doing, allows the pair of push buttons 282 of the base 258 of the heat air gun 222 to be spring-loaded and thereby squeezable.

Each of the pair of push buttons 282 of the base 258 of the heat air gun 222 has a pair of ends 288 and a pair of clips 290.

The pair of clips 290 of each of the pair of push buttons 282 of the base 258 of the heat air gun 222 are disposed on the pair of ends 288 of an associated push button 282 of the base 258 of the heat air gun 222, are outwardly facing, and when the pair of push buttons 282 of the base 258 of the heat air gun 222 are squeezed, the pair of clips 290 of each of the pair of push buttons 282 of the base 258 of the heat air gun 222 move inwardly towards each other.

(2) Specific configuration of the tripod 224.

The specific configuration of the tripod 224 can best be seen in FIG. 22, which is a diagrammatic perspective view of the kit of the second embodiment of the present invention supporting and multi-directionally aiming a heat source, and as such, will be discussed with reference thereto.

The tripod 224 comprises a trifucated hip bracket 294.

The trifucated hip bracket 294 of the tripod 224 has a central through bore 296 and three sockets 298.

The three sockets 298 of the trifucated hip bracket 294 of the tripod 224 are pivotable, are spaced-apart equally around the central through bore 296 of the trifucated hip bracket 294 of the tripod 224, and depend slightly outwardly therefrom.

The tripod 224 further comprises three legs 300.

The three legs 300 of the tripod 224 are tubular, engage in, and depend from, the three sockets 298 of the trifucated hip bracket 294 of the tripod 224, respectively, to distal ends 301, respectively, for resting on a supporting surface 302.

The tripod 224 further comprises three lockable casters 304.

The three lockable casters 304 of the tripod 224 are disposed on the distal ends 301 of the three legs 300 of the tripod 224, respectively, for increased mobility of the tripod 224.

The tripod 224 further comprises a fixed outer center column 306.

The fixed outer center column 306 of the tripod 224 is tubular, and depends from in the central through bore 296 of the trifucated hip bracket 294 of the tripod 224 to a distal end 308.

The tripod 224 further comprises three leg braces 310.

The three leg braces 310 of the tripod 224 are tubular, and extend pivotally from the distal end 308 of the fixed outer center column 306 of the tripod 224 pivotally and slidably to the three legs 300 of the tripod 224, respectively.

The tripod 224 further comprises three lemon squeeze leg locks 312.

The three lemon squeeze leg locks 312 of the tripod 224 pivotally and slidably attach the three leg braces 310 of the tripod 224 to the three legs 300 of the tripod 224, respectively.

Each lemon squeeze leg lock 312 of the tripod 224 has a pair of opposing buttons 314.

The pair of opposing buttons 314 of each lemon squeeze leg lock 312 of the tripod 224, when squeezed, allow an associated leg brace 310 of the tripod 224 to slide up and down an associated leg 300 of the tripod 224.

The tripod 224 further comprises a height adjustable inner center column 316.

The height adjustable inner center column 316 of the tripod 224 extends telescopically up and down from in the fixed outer center column 306 of the tripod 224 so as to be height adjustable.

The tripod 224 further comprises a lemon squeeze column lock 318.

The lemon squeeze column lock 318 of the tripod 224 is affixed to the fixed outer center column 306 of the tripod 224 from where the fixed outer center column 306 of the tripod 224 emerges from the trifucated hip bracket 294 of the tripod 224 and allows the height adjustable inner center column 316 of the tripod 224 to slide in and out of the fixed outer center column 306 of the tripod 224 to adjust height of the height adjustable inner center column 316 of the tripod 224.

The lemon squeeze column lock 318 of the tripod 224 has a pair of opposing buttons 320.

The pair of opposing buttons 320 of the lemon squeeze leg lock 318 of the tripod 224, when squeezed, allow the height adjustable inner center column 316 of the tripod 224 to slide up and down from within the fixed outer center column 306 of the tripod 224.

The tripod 224 further comprises a selectively rotatable and lockable joint 322.

The selectively rotatable and lockable joint 322 of the tripod 224 extends upwardly from the height adjustable inner center column 316 of the tripod 224.

The selectively rotatable and lockable joint 322 of the tripod 224 has a pair of opposing interlocking jaws 324.

The pair of opposing interlocking jaws 324 of the selectively rotatable and lockable joint 322 of the tripod 224 allow the selectively rotatable and lockable joint 322 of the tripod 224 to rotate.

The selectively rotatable and lockable joint 322 of the tripod 224 has a cooperating threaded shaft and wing nut 326.

The cooperating threaded shaft and wing nut 326 of the selectively rotatable and lockable joint 322 of the tripod 224 passes through the pair of opposing interlocking jaws 324 of the selectively rotatable and lockable joint 322 of the tripod 224 and locks the pair of opposing interlocking jaws 324 of the selectively rotatable and lockable joint 322 of the tripod 224 in place once the selectively rotatable and lockable joint 322 of the tripod 224 has been oriented as required.

The tripod 224 further comprises a platform 328.

The platform 328 of the tripod 224 is disposed on the selectively rotatable and lockable joint 322 of the tripod 224, moves therewith, and can replaceably receive one of the heat air gun 222 and the extension arm 226.

Each leg 300 of the tripod 224 has a hook 329.

The hook 329 of each leg 300 of the tripod 224 engages an adjustable weight 329a for adding stability to the tripod 224.

The adjustable weight 329a of the tripod 224 has a through bore 329b.

The through bore 329b of the adjustable weight 329a of the tripod 224 receives the hook 329 of an associated leg 300 of the tripod 224.

The adjustable weight 329a of the tripod 224 further has a pair of hook and loop fastener straps 329c.

The pair of hook and loop fastener straps 329c of the adjustable weight 329a of the tripod 224 wrap around an associated leg 300 of the tripod 224.

(a) Specific Configuration of the Platform 328 of the Tripod 224.

The specific configuration of the platform 328 can best be seen in FIGS. 22, 23, 24, and 25, which are, respectively, a diagrammatic perspective view of the kit of the second embodiment of the present invention supporting and multi-directionally aiming a heat source, a cross sectional view taken on LINE 23-23 in FIG. 22 with some parts omitted for clarity, a cross sectional view taken on LINE 24-24 in FIG. 23 with some parts omitted for clarity, and a partial cross sectional view taken on LINE 25-25 in FIG. 23, with some parts omitted for clarity, of just the support base which holds a heat air gun, and as such, will be discussed with reference thereto.

The platform 328 of the tripod 224 is generally rectangular-shaped, and generally perpendicular to the selectively rotatable and lockable joint 322 of the tripod 224.

The platform 328 of the tripod 224 has a free top 330 and a pair of side walls 332.

Each side wall 332 of the platform 128 of the tripod 224 has a pair of notches 334.

(3) Method of Attaching and Releasing the Heat Air Gun 222 to and from the Tripod 224, Respectively.

The heat air gun 222 seats releasably in the platform 328 of the tripod 224, via the free top 330 of the platform 328 of the tripod 224, with the pair of clips 290 of each of the pair of push buttons 282 of the base 258 of the heat air gun 222 releasably engaged in the pair of notches 334 of each side wall 332 of the platform 128 of the tripod 224, respectively, and are released therefrom, when the pair of push buttons 282 of the base 258 of the heat air gun 222 are squeezed thereby allowing the heat air gun 222 to be removed from the platform 328 of the tripod 224.

(4) Specific Configuration of the Extension Arm 226.

Figure 27:
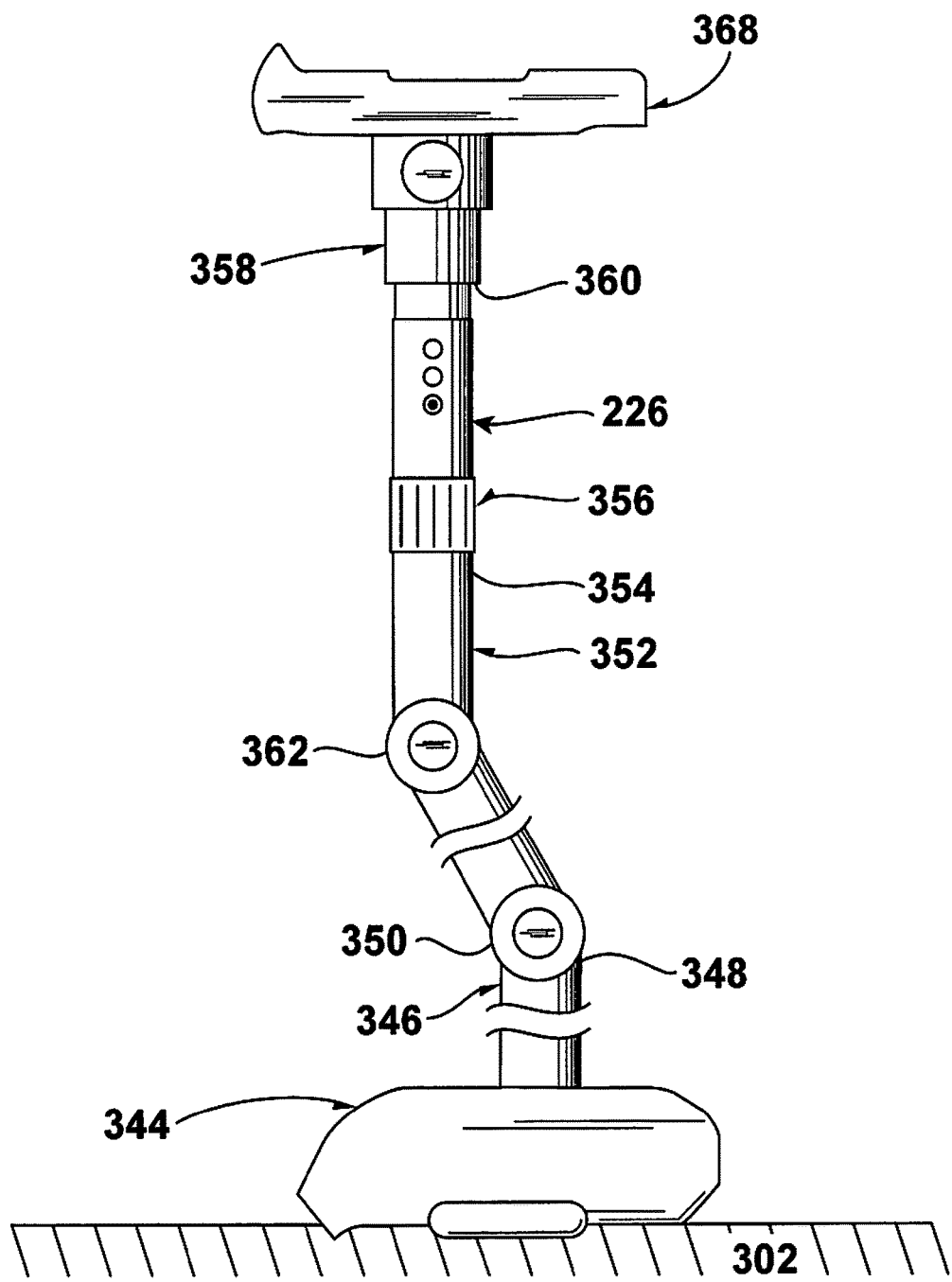
FIG. 27 is an enlarged diagrammatic side elevational view with parts broken away of the adjustable support structure enclosed in the dotted oval indicated by ARROW 27 in FIG. 22.

The specific configuration of the extension arm 226 can best be seen in FIG. 27, which is an enlarged diagrammatic side elevational view with parts broken away of the adjustable support structure enclosed in the dotted oval indicated by ARROW 27 in FIG. 22, and as such, will be discussed with reference thereto.

The extension arm 226 comprises a base 344.

The base 344 of the extension arm 226 is similar to the base 258 of the heat air gun 222, and is one of free, attached to the platform 328 of the tripod 224, and is for resting on the supporting surface 302.

The extension arm 226 further comprises a lower fixed pole 346.

The lower fixed pole 346 of the extension arm 226 extends perpendicularly from the base 344 of the extension arm 226 to a distal end 348.

The extension arm 226 further comprises a selectively rotatable and lockable lower joint 350.

The selectively rotatable and lockable lower joint 350 of the extension arm 226 is disposed at the distal end 348 of the lower fixed pole 346 of the extension arm 226, and can be taught, for example, by U.S. Pat. No. 8,672,576 to Lee and U.S. Pat. No. 7,591,604 to Roberts, both incorporated herein in their entirety by reference thereto.

The extension arm 226 further comprises an outer upper pole 352.

The outer upper pole 352 of the extension arm 226 extends pivotally from the selectively rotatable and lockable lower joint 350 of the extension arm 226 to a distal end 354.

The extension arm 226 further comprises a twist lock locking mechanism 356. The twist lock locking mechanism 356 of the extension arm 226 is coaxially affixed to the distal end 354 of the outer upper pole 352 of the extension arm 226, and can be taught, for example, by U.S. Pat. No. 2,980,456 to McMullin, incorporated herein in its entirety by reference thereto.

The extension arm 226 further comprises a height adjustable inner upper pole 358.

The height adjustable inner upper pole 358 of the extension arm 226 extends length adjustably from the twist lock locking mechanism 356 of the extension arm 226 to a distal end 360.

The extension arm 226 further comprises a selectively rotatable and lockable upper joint 362.

The selectively rotatable and lockable upper joint 362 of the extension arm 236 is disposed in the outer upper pole 352 of the extension arm 226.

The extension arm 226 further comprises a platform 368.

The platform 368 of the extension arm 226 is perpendicularly affixed to the distal end 360 of the height adjustable inner upper pole 358 of the extension arm 226, and is similar to the platform 328 of the tripod 224.

(a) Specific Configuration of Each of the Selectively Rotatable and Lockable Lower Joint 350 of the Extension Arm 226 and the Selectively Rotatable and Lockable Upper Joint 362 of the Extension Arm 226.

Figure 26:
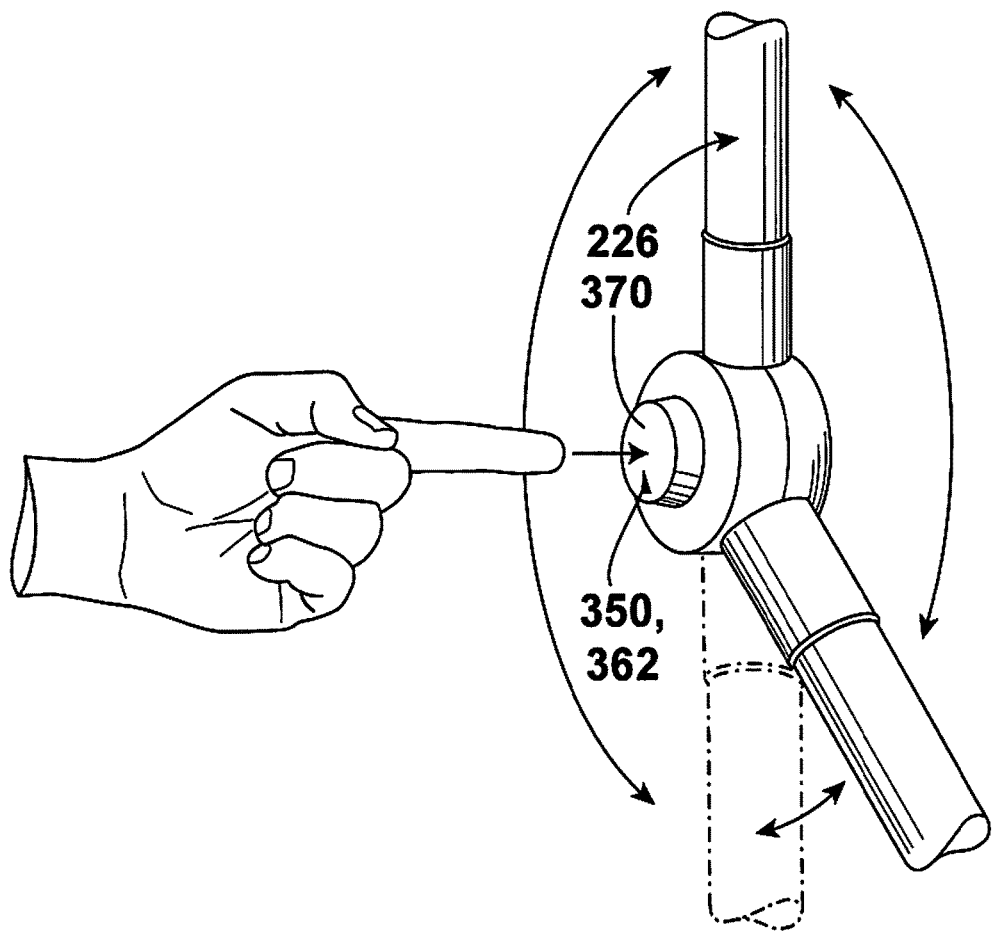
FIG. 26 is an enlarged diagrammatic perspective view of the rotatable push button adjustable joints enclosed in the dotted circles indicated by ARROW 26 in FIG. 22.

The specific configuration of each of the selectively rotatable and lockable lower joint 350 of the extension arm 226 and the selectively rotatable and lockable upper joint 362 of the extension arm 226 can best be seen in FIG. 26, which is an enlarged diagrammatic perspective view of the rotatable push button adjustable joints enclosed in the dotted circles indicated by ARROW 26 in FIG. 22, and as such, will be discussed with reference thereto.

Each of the selectively rotatable and lockable lower joint 350 of the extension arm 226 and the selectively rotatable and lockable upper joint 362 of the extension arm 226 has a push button 370.

The push button 370 of each of the selectively rotatable and lockable lower joint 350 of the extension arm 226 and the selectively rotatable and lockable upper joint 362 of the extension arm 226, when pushed, allow the selectively rotatable and lockable lower joint 350 of the extension arm 226 and the selectively rotatable and lockable upper joint 362 of the extension arm 226 to selectively rotate.

(5) Accessories.

Figure 28:
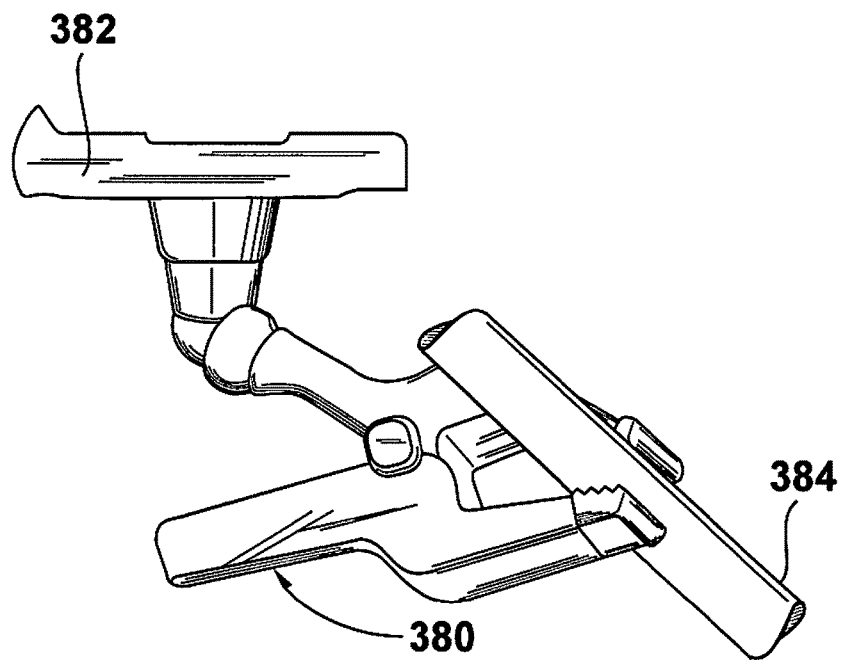
FIG. 28 is a diagrammatic perspective view illustrating a clip accessory that facilitates clamping a support base to various convenient objects.

As shown in FIG. 28, which is a diagrammatic perspective view illustrating a clip accessory that facilitates clamping a support base to various convenient objects, the kit 220 further comprises a clamp 380 for attaching the heat air gun 222 to a desired structure 384, such as, but not limited to, a railing.

The clamp 380 is pivotally attached to a platform 382.

The platform 382 of the clamp 382 is similar to the platform 328 of the tripod 224 and the platform 368 of the extension arm 226.

Figure 29:
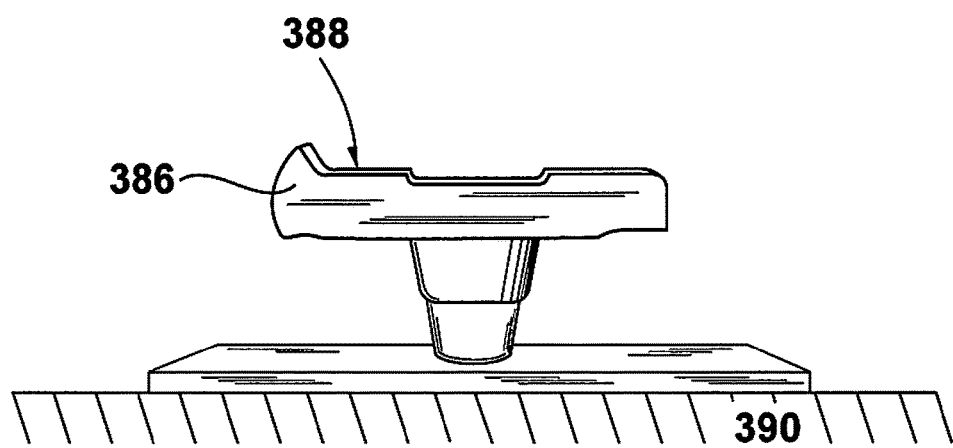
FIG. 29 is a diagrammatic perspective view illustrating stanchion with a support base that holds a heat air gun, which facilitates resting the heated air gun on various convenient flat surfaces.

As shown in FIG. 29, which is a diagrammatic perspective view illustrating a stanchion with a support base that holds a heat air gun, which facilitates resting the heated air gun on various convenient flat surfaces, the kit 220 further comprises a stanchion base 386 for attaching the heat air gun 222 to a horizontal surface 390.

The stanchion base 386 is pivotally attached to a platform 388.

The platform 388 of the stanchion base 386 is similar to the platform 328 of the tripod 224 and the platform 368 of the extension arm 226.

D. Impressions.

It will be understood that each of the elements described above or two or more together may also find a useful application in other types of constructions differing from the types described above.

While the embodiments of the present invention have been illustrated and described as embodied in a variable speed heat air gun and cooperating kit, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A kit for supporting and multi-directionally aiming a heat source, comprising:
   a) a heat air gun;
   b) a tripod; and
   c) an extension arm;
   wherein at least one of said tripod and said extension arm support said heat air gun so as to allow said heat air gun to be supported while having multi-directional aiming;
   wherein said heat air gun comprises:
   a) a housing;
   b) a nozzle; and
   c) a handle;
   wherein said nozzle of said heat air gun extends generally horizontally from said housing of said heat air gun to a distal end;
   wherein said nozzle of said heat air gun has a generally oval lateral cross section for maximizing air volume exiting said heat air gun;
   wherein said handle of said heat air gun depends generally perpendicularly from said housing of said heat air gun to a distal end;
   wherein said housing of said heat air gun has an upper rear end;
   wherein said heat air gun comprises an air intake;
   wherein said air intake of said housing of said heat air gun is disposed at said upper rear end of said housing of said heat air gun;
   wherein said air intake of said heat air gun has a vented twist-on cap;
   wherein said vented twist-on cap of said air intake of said heat air gun is threadably attached to said upper rear end of said housing of said heat air gun;
   wherein said air intake of said heat air gun has a replaceable paper filter;
   wherein said replaceable paper filter of said air intake of said heat air gun is disposed under said vented twist on cap of said air intake of said heat air gun; and
   wherein said replaceable paper filter of said air intake of said heat air gun is for filtering air entering said vented twist on cap of said air intake of said heat air gun;
   wherein said heat air gun comprises a motor;
   wherein said heat air gun comprises an impeller;
   wherein said motor of said heat air gun is contained within said housing of said heat air gun;
   wherein said motor of said heat air gun spins said impeller of said heat air gun for drawing cold air into said air intake of said heat air gun and expelling heated air out of said nozzle of said heat air gun;
   wherein said motor of said heat air gun is variable speed, 875 watts, 125 volts, and 15 amps;
   wherein said heat air gun comprises heating element coils;
   wherein said heating element coils of said heat air gun are contained within said nozzle of said heat air gun; and
   wherein said heating element coils of said heat air gun are for heating the cold air drawn into said air intake of said heat air gun by said motor of said heat air gun;
   wherein said heat air gun comprises a first rocker switch;
   wherein said first rocker switch of said heat air gun is disposed on said handle of said heat air gun;
   wherein said first rocker switch of said heat air gun is disposed just below said nozzle of said heat air gun;
   wherein said first rocker switch of said heat air gun is in electrical communication with said heating element of said heat air gun;
   wherein said first rocker switch of said heat air gun controls heat of said heating element of said heat air gun;
   wherein said first rocker switch of said heat air gun has two heat settings;
   wherein said heat air gun comprises a second rocker switch;
   wherein said second rocker switch of said heat air gun is disposed on said handle of said heat air gun;
   wherein said second rocker switch of said heat air gun is disposed just below said first rocker switch of said heat air gun;
   wherein said second rocker switch of said heat air gun is in electrical communication with said motor of said heat air gun;
   wherein said second rocker switch of said heat air gun controls speed of said motor of said heat air gun;
   wherein said second rocker switch of said heat air gun has two speed settings in addition to off;
   wherein said heat air gun comprises a base;
   wherein said base of said heat air gun is disposed at said distal end of said handle of said heat air gun;
   wherein said base of said heat air gun is generally perpendicular to said handle of said heat air gun;
   wherein said base of said heat air gun has a lower free surface for allowing said heat air gun to stand upright on its own on a flat surface without a need to be held;
   wherein said base of said heat air gun has a rear side;
   wherein said heat air gun comprises an electrical cord;
   wherein said heat air gun comprises a battery pack;
   wherein said electrical cord of said heat air gun extends out from said rear side of said handle of said heat air gun;
   wherein said electrical cord of said heat air gun is in electrical communication with said motor of said heat air gun; and
   wherein said electrical cord of said heat air gun is in electrical communication with said heating element of said heat air gun;
   wherein said electrical cord of said heat air gun forms a power source interface; and
   wherein said power source interface of said electrical cord of said heat air gun is for electrically communicating with an AC power source;
   wherein said base of said heat air gun has:
   a) a pair of opposite sides; and
   b) a pair of push buttons.

2. The kit of claim 1, wherein said pair of push buttons of said base of said heat air gun are operatively connected through said pair of opposite sides of said base of said heat air gun, respectively.

3. The kit of claim 2, wherein said base of said heat air gun has a central spring seat.

4. The kit of claim 3, wherein said central spring seat of said base of said heat air gun is fixedly attached within said base of said heat air gun.

5. The kit of claim 4, wherein said central spring seat of said base of said heat air gun is disposed equidistantly between said pair of push buttons of said base of said heat air gun.

6. The kit of claim 5, wherein said central spring seat of said base of said heat air gun is in alignment with said pair of push buttons of said base of said heat air gun.

7. The kit of claim 6, wherein said base of said heat air gun has a pair of coil springs.

8. The kit of claim 7, wherein said pair of coil springs of said base of said heat air gun extend from opposite sides of said central spring seat of said base of said heat air gun to said pair of push buttons of said base of said heat air gun, respectively, and in so doing, allows said pair of push buttons of said base of said heat air gun to be spring-loaded and thereby squeezable.

9. The kit of claim 8, wherein each of said pair of push buttons of said base of said heat air gun has:
a) a pair of ends; and
b) a pair of clips.

10. The kit of claim 9, wherein said pair of clips of each of said pair of push buttons of said base of said heat air gun are disposed on said pair of ends of an associated push button of said base of said heat air gun.

11. The kit of claim 10, wherein said pair of clips of each of said pair of push buttons of said base of said heat air gun are outwardly facing.

12. The kit of claim 11, wherein said pair of clips of each of said pair of push buttons of said base of said heat air gun move inwardly towards each other when said pair of push buttons of said base of said heat air gun are squeezed.

13. The kit of claim 12, wherein said tripod comprises a trifucated hip bracket.

14. The kit of claim 13, wherein said trifucated hip bracket of said tripod has:
a) a central through bore; and
b) three sockets.

15. The kit of claim 14, wherein said three sockets of said trifucated hip bracket of said tripod are pivotable.

16. The kit of claim 15, wherein said three sockets of said trifucated hip bracket of said tripod are spaced-apart equally around said central through bore of said trifucated hip bracket of said tripod.

17. The kit of claim 16, wherein said three sockets of said trifucated hip bracket of said tripod depend slightly outwardly from said central through bore of said trifucated hip bracket of said tripod.

18. The kit of claim 17, wherein said tripod comprises three legs.

19. The kit of claim 18, wherein said three legs of said tripod are tubular.

20. The kit of claim 19, wherein said three legs of said tripod engage in said three sockets of said trifucated hip bracket of said tripod, respectively.

21. The kit of claim 20, wherein said three legs of said tripod depend from said three sockets of said trifucated hip bracket of said tripod, respectively, to distal ends, respectively, for resting on a supporting surface.

22. The kit of claim 21, wherein said tripod comprises three lockable casters.

23. The kit of claim 22, wherein said three lockable casters of said tripod are disposed on said distal ends of said three legs of said tripod, respectively, for increased mobility for said tripod.

24. The kit of claim 23, wherein said tripod comprises a fixed outer center column.

25. The kit of claim 24, wherein said fixed outer center column of said tripod is tubular.

26. The kit of claim 25, wherein said fixed outer center column of said tripod depends from in said central through bore of said trifucated hip bracket of said tripod to a distal end.

27. The kit of claim 26, wherein said tripod comprises three leg braces.

28. The kit of claim 27, wherein said three leg braces of said tripod are tubular.

29. The kit of claim 28, wherein said three leg braces of said tripod extend pivotally from said distal end of said fixed outer center column of said tripod pivotally and slidably to said three legs of said tripod, respectively.

30. The kit of claim 29, wherein said tripod comprises three lemon squeeze leg locks.

31. The kit of claim 30, wherein said three lemon squeeze leg locks of said tripod pivotally attach said three leg braces of said tripod to said three legs of said tripod, respectively.

32. The kit of claim 31, wherein said three lemon squeeze leg locks of said tripod slidably attach said three leg braces of said tripod to said three legs of said tripod, respectively.

33. The kit of claim 32, wherein each lemon squeeze leg lock of said tripod has a pair of opposing buttons.

34. The kit of claim 33, wherein said pair of opposing buttons of each lemon squeeze leg lock of said tripod, when squeezed, allow an associated leg brace of said tripod to slide up and down an associated leg of said tripod.

35. The kit of claim 34, wherein said tripod comprises a height adjustable inner center column.

36. The kit of claim 35, wherein said height adjustable inner center column of said tripod extends telescopically up and down from in said fixed outer center column of said tripod so as to be height adjustable.

37. The kit of claim 36, wherein said tripod comprises a lemon squeeze column lock.

38. The kit of claim 37, wherein said lemon squeeze column lock of said tripod is affixed to said fixed outer center column of said tripod from where said fixed outer center column of said tripod emerges from said trifucated hip bracket of said tripod.

39. The kit of claim 38, wherein said lemon squeeze column lock of said tripod allows said adjustable inner center column of said tripod to slide in and out of said fixed outer center column of said tripod to adjust height of said height adjustable inner center column of said tripod.

40. The kit of claim 39, wherein said lemon squeeze column lock of said tripod has a pair of opposing buttons.

41. The kit of claim 40, wherein said pair of opposing buttons of said lemon squeeze leg lock of said tripod, when squeezed, allow said height adjustable inner center column of said tripod to slide up and down from within said fixed outer center column of said tripod.

42. The kit of claim 41, wherein said tripod comprises a selectively rotatable and lockable joint.

43. The kit of claim 42, wherein said selectively rotatable and lockable joint of said tripod extends upwardly from said height adjustable inner center column of said tripod.

44. The kit of claim 43, wherein said selectively rotatable and lockable joint of said tripod has a pair of opposing interlocking jaws.

45. The kit of claim 44, wherein said pair of opposing interlocking jaws of said selectively rotatable and lockable joint of said tripod allow said selectively rotatable and lockable joint of said tripod to rotate.

46. The kit of claim 45, wherein said selectively rotatable and lockable joint of said tripod has a cooperating threaded shaft and wing nut.

47. The kit of claim 46, wherein said cooperating threaded shaft and wing nut of said selectively rotatable and lockable joint of said tripod passes through said pair of opposing interlocking jaws of said selectively rotatable and lockable joint of said tripod.

48. The kit of claim 47, wherein said cooperating threaded shaft and wing nut of said selectively rotatable and lockable joint of said tripod locks said pair of opposing interlocking jaws of said selectively rotatable and lockable joint of said tripod in place once said selectively rotatable and lockable joint of said tripod has been oriented as required.

49. The kit of claim 48, wherein said tripod comprises a platform.

50. The kit of claim 49, wherein said platform of said tripod is disposed on said selectively rotatable and lockable joint of said tripod.

51. The kit of claim 50, wherein said platform of said tripod moves with said selectively rotatable and lockable joint of said tripod.

52. The kit of claim 51, wherein said platform of said tripod replaceably receive one of said heat air gun and said extension arm.

53. The kit of claim 52, wherein each leg of said tripod has a hook.

54. The kit of claim 53, wherein said hook of each leg of said tripod engages an adjustable weight for adding stability to said tripod.

55. The kit of claim 54, wherein said adjustable weight of said tripod has a through bore.

56. The kit of claim 55, wherein said through bore of said adjustable weight of said tripod receives said hook of an associated leg of said tripod.

57. The kit of claim 56, wherein said adjustable weight of said tripod has a pair of hook and loop fastener straps.

58. The kit of claim 57, wherein said pair of hook and loop fastener straps of said adjustable weight of said tripod wrap around an associated leg of said tripod.

59. The kit of claim 58, wherein said platform of said tripod is generally rectangular-shaped.

60. The kit of claim 59, wherein said platform of said tripod is generally perpendicular to said selectively rotatable and lockable joint of said tripod.

61. The kit of claim 60, wherein said platform of said tripod has:
 a) a free top; and
 b) a pair of side walls.

62. The kit of claim 61, wherein each side wall of said platform of said tripod has a pair of notches.

63. The kit of claim 62, wherein said heat air gun seats releasably in said platform of said tripod, via said free top of said platform of said tripod, with said pair of clips of each of said pair of push buttons of said base of said heat air gun releasably engaged in said pair of notches of each side wall of said platform of said tripod, respectively, and are released therefrom, when said pair of push buttons of said base of said heat air gun are squeezed releasing said pair of clips of each of said pair of push buttons of said base of said heat air gun to disengage from said pair of notches of each side wall of said platform of said tripod, respectively, and thereby allowing said heat air gun to be removed from said platform of said tripod.

64. The kit of claim 63, wherein said extension arm comprises a base.

65. The kit of claim 64, wherein said base of said extension arm is similar to said base of said heat air gun.

66. The kit of claim 65, wherein said base of said extension arm is one of free, attached to said platform of said tripod, and for resting on the supporting surface.

67. The kit of claim 66, wherein said extension arm comprises a lower fixed pole.

68. The kit of claim 67, wherein said lower fixed pole of said extension arm extends perpendicularly from said base of said extension arm to a distal end.

69. The kit of claim 68, wherein said extension arm comprises a selectively rotatable and lockable lower joint.

70. The kit of claim 69, wherein said selectively rotatable and lockable lower joint of said extension arm is disposed at said distal end of said lower fixed pole of said extension arm.

71. The kit of claim 70, wherein said extension arm comprises an outer upper pole.

72. The kit of claim 71, wherein said outer upper pole of said extension arm extends pivotally from said selectively rotatable and lockable lower joint of said extension arm to a distal end.

73. The kit of claim 72, wherein said extension arm comprises a twist lock locking mechanism.

74. The kit of claim 73, wherein said twist lock locking mechanism of said extension arm is coaxially affixed to said distal end of said outer upper pole of said extension arm.

75. The kit of claim 74, wherein said extension arm comprises a height adjustable inner upper pole.

76. The kit of claim 75, wherein said height adjustable inner upper pole of said extension arm extends length adjustably from said twist lock locking mechanism of said extension arm to a distal end.

77. The kit of claim 76, wherein said extension arm comprises a selectively rotatable and lockable upper joint.

78. The kit of claim 77, wherein said selectively rotatable and lockable upper joint of said extension arm is disposed in said outer upper pole of said extension arm.

79. The kit of claim 78, wherein said extension arm comprises a platform.

80. The kit of claim 79, wherein said platform of said extension arm is perpendicularly affixed to said distal end of said height adjustable inner upper pole of said extension arm.

81. The kit of claim 80, wherein said platform of said extension arm is similar to said platform of said tripod.

82. The kit of claim 81, wherein each of said selectively rotatable and lockable lower joint of said extension arm and said selectively rotatable and lockable upper joint of said extension arm has a push button.

83. The kit of claim 82, wherein said push button of each of said selectively rotatable and lockable lower joint of said extension arm and said selectively rotatable and lockable upper joint of said extension arm, when pushed, allow said selectively rotatable and lockable lower joint of said extension arm and said selectively rotatable and lockable upper joint of said extension arm to selectively rotate.

\* \* \* \* \*